(12) United States Patent
Ballantyne et al.

(10) Patent No.: US 11,797,022 B1
(45) Date of Patent: Oct. 24, 2023

(54) SYSTEM FOR OBJECT DETECTION BY AN AUTONOMOUS MOBILE DEVICE

(71) Applicant: AMAZON TECHNOLOGIES, INC., Seattle, WA (US)

(72) Inventors: James Ballantyne, Half Moon Bay, CA (US); Eric Foxlin, Belmont, CA (US); Lu Xia, Redmond, WA (US); Simon Edwards-Parton, Menlo Park, CA (US); Boshen Niu, San Mateo, CA (US); Harish Annavajjala, Santa Clara, CA (US)

(*) Notice: Subject to any disclaimer, the term of this patent is extended or adjusted under 35 U.S.C. 154(b) by 179 days.

(21) Appl. No.: 17/305,013

(22) Filed: Jun. 29, 2021

(51) Int. Cl.
| | |
|---|---|
| G05D 1/00 | (2006.01) |
| G05D 1/02 | (2020.01) |
| G06T 7/593 | (2017.01) |
| G06T 7/12 | (2017.01) |
| G06T 7/521 | (2017.01) |
| G06T 7/13 | (2017.01) |

(52) U.S. Cl.
CPC ......... *G05D 1/0251* (2013.01); *G05D 1/0088* (2013.01); *G05D 1/0214* (2013.01); *G06T 7/12* (2017.01); *G06T 7/13* (2017.01); *G06T 7/521* (2017.01); *G06T 7/593* (2017.01); *G06T 2207/10012* (2013.01); *G06T 2207/10028* (2013.01); *G06T 2207/30261* (2013.01)

(58) Field of Classification Search
CPC .. G05D 1/0251; G05D 1/0088; G05D 1/0214; G06T 7/12; G06T 7/521; G06T 7/13; G06T 7/593; G06T 2207/10012; G06T 2207/10028; G06T 2207/30261

USPC .......................................................... 701/25
See application file for complete search history.

(56) References Cited

U.S. PATENT DOCUMENTS

| | | | |
|---|---|---|---|
| 2016/0291155 A1* | 10/2016 | Nehmadi | G05D 1/0088 |
| 2022/0044439 A1* | 2/2022 | Hou | G06T 7/75 |
| 2022/0101549 A1* | 3/2022 | Sadeghi | G06V 20/58 |

OTHER PUBLICATIONS

Stefan Hoermann, Felix Kunz, Dominik Nuss, Stephan Reuter, and Klaus Dietmayer, "Entering Crossroads with Blind Corners. A Safe Strategy for Autonomous Vehicles.," Jun. 2017, IEEE, IEEE Intelligent Vehicles Symposium (IV), 727-732. (Year: 2017).*

(Continued)

*Primary Examiner* — Tyler J Lee
*Assistant Examiner* — Tiffany P Ohman
(74) *Attorney, Agent, or Firm* — Lindauer Law, PLLC

(57) ABSTRACT

An autonomous mobile device (AMD) may move around a physical space while performing tasks. Sensor data is used to determine an occupancy map of the physical space. Some objects within the physical space may be difficult to detect because of characteristics that result in lower confidence in sensor data, such as transparent or reflective objects. To include difficult-to-detect objects in the occupancy map, image data is processed to identify portions of the image that includes features associated with difficult-to-detect objects. Given the portion that possibly includes difficult-to-detect objects, the AMD attempts to determine where in the physical space that portion corresponds to. For example, the AMD may use stereovision to determine the physical area associated with the features depicted in the portion. Objects in that area are included in an occupancy map annotated as objects that should persist unless confirmed to not be within the physical space.

20 Claims, 8 Drawing Sheets

(56) References Cited

OTHER PUBLICATIONS

"Convolutional neural network", Wikipedia, 31 pages. Retrieved from the Internet: URL: https://en.wikipedia.org/wiki/Convolutional_neural_network.
Costea, et al., "Obstacle Localization and Recognition for Autonomous Forklifts using Omnidirectional Stereovision", Preprint submitted to 2015 IEEE Intelligent Vehicles Symposium, Jan. 29, 2015, 6 pgs.
Jordan, Jeremy, "An overview of semantic image segmentation", May 21, 2018, 26 pgs. Retrieved from the Internet: URL: https://www.jeremyjordan.me/semantic-segmentation/.

* cited by examiner

SYSTEM FOR OBJECT DETECTION BY AN AUTONOMOUS MOBILE DEVICE

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
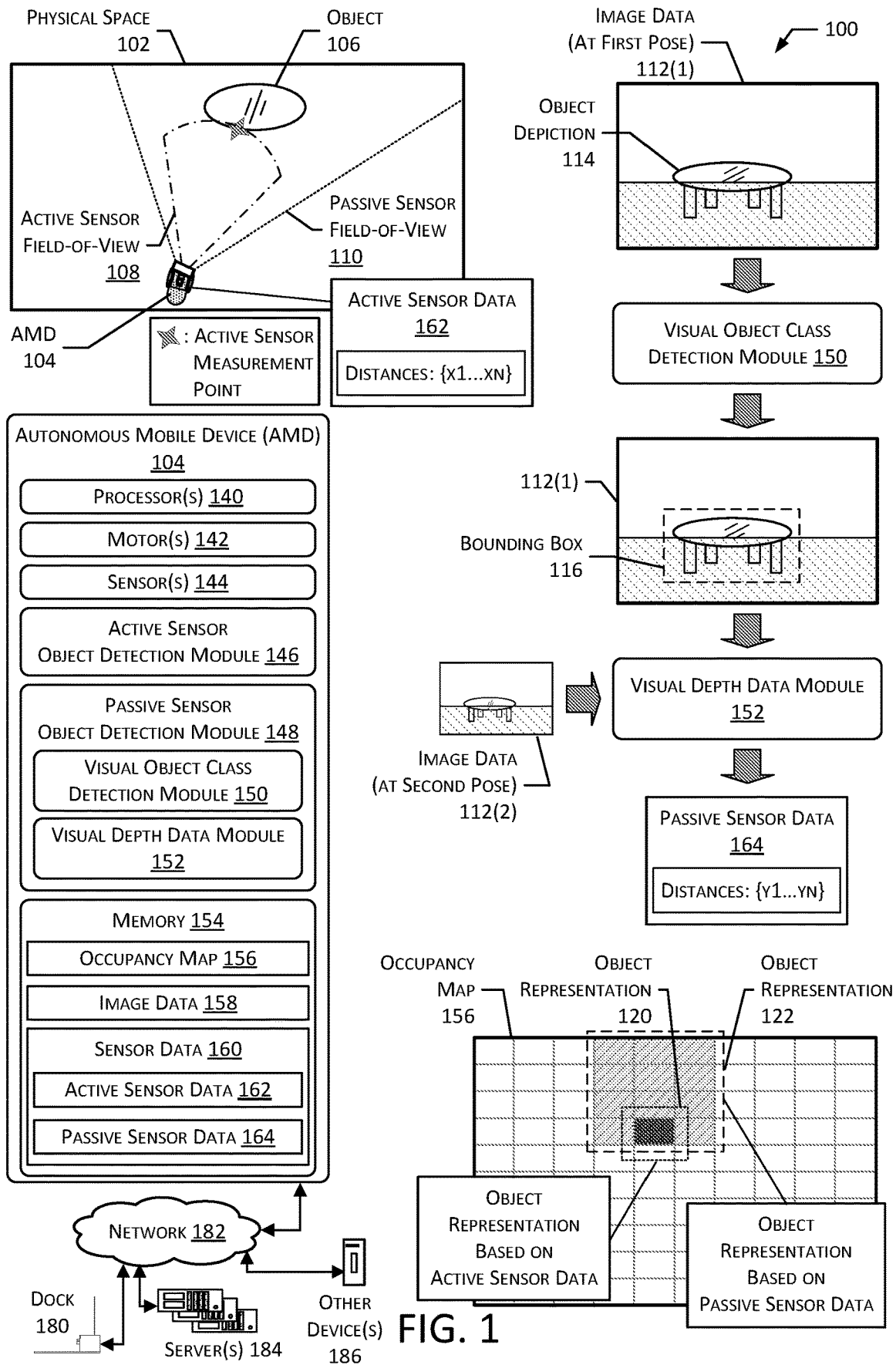
FIG. 1 illustrates a system 100 for object detection by an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) may move from one location in a physical space to another location without being controlled by a user. A user may interact with the AMD, and the AMD may perform tasks that involve moving in the physical space, displaying information, accepting input, and so forth. To navigate between locations in the physical space, the AMD may use an occupancy map. An occupancy map may indicate shapes and sizes of different areas in the physical space. An occupancy map may also indicate which areas of the physical space are being occupied by objects.

To determine an occupancy map, the AMD may use different types of sensors, including active sensors and passive sensors. Active sensors emit a signal, while passive sensors do not. For most objects within a physical space, active sensors provide precise information about a size, shape, and location of an object. Because of their precision, active sensors are generally used to build an occupancy map suitable for navigation.

However, some objects are difficult to detect using active sensors. For example, a glass table may be difficult to detect because it does not reflect enough light to be reliably detected by an active sensor. An object may be difficult to detect for an active sensor if parts of the object appear to be other objects, such as objects behind the object or objects reflected by the object. Examples of difficult-to-detect objects include transparent, partially transparent, or reflective objects, such as glass furniture, windows, or mirrors.

In comparison, a passive sensor such as a stereocamera that acquires image data for stereovision does not emit a signal during operation. Instead, stereovision techniques are used to determine information about the size, shape, and location of an object. Compared to an active sensor, depth data for an object obtained from stereovision may be less precise than that obtained from an active sensor. As a result, passive sensors may be less certain as to the placement and size of an object in the physical space.

Because the active sensor and the passive sensor operate on different principles, they provide different data about the physical space. For example, the glass table may be difficult to detect on the basis of reflected signals from the active sensor while being at least somewhat visible in the image data obtained by the stereocamera.

Traditional systems that only use active sensors may not reliably determine presence or location of difficult-to-detect objects. Traditional approaches that use computer vision techniques may also fail to provide identification of a difficult-to-detect object using only image-based techniques. Further, traditional approaches may not use active sensors to modify a confidence in a determination of a difficult-to-detect object that has been identified using image-based techniques.

Described in this disclosure are techniques to use active sensors and passive sensors to determine an occupancy map of a physical space that includes indications of difficult-to-detect objects. As the AMD is generating an occupancy map of a physical space, active sensors are used to determine first occupancy data indicative of objects in the physical space, and passive sensors are used to determine second occupancy data of objects in the physical space. The occupancy map may be used by the AMD to navigate, determine a speed to move, and so forth.

As described in this disclosure the AMD uses a combination of two techniques that use passive sensor data to improve detection of difficult-to-detect objects. The first technique uses a neural network to process image data as the AMD moves about the physical space. If the neural network identifies a difficult-to-detect object within image data, then the neural network identifies a portion of the image data that includes a depiction of the difficult-to-detect object. The second technique processes the portion of the image identified by the neural network to determine depth data associated with features of the difficult-to-detect object. The AMD may then use the depth data indicative of the difficultto-detect object to determine the second occupancy data used to update the occupancy map.

As an example, the AMD may determine image data that is representative of a scene of a physical space. In this example, the physical space includes a transparent coffee table. Image data may include first image data from a first pose and second image data from a second pose. The image data may be determined by stereo cameras or by a mono camera at different poses.

A neural network is trained to identify difficult-to-detect objects based on their appearance in image data. In this example, the first image data is processed by the trained neural network to designate a portion of the image that includes a difficult-to-detect object. The neural network, based on the first image data, may identify the transparent coffee table.

To determine the second occupancy data indicative of the transparent coffee table to update the occupancy map, the AMD determines depth data indicative of a set of distance values to the transparent coffee table. The AMD may determine the set of distance values using stereovision based on two different images of the same scene of the physical space with respect to a same one or more features. In this example, the first image data is determined using one or more cameras at a first pose, and second image data may be determined using the one or more cameras at a second pose.

The AMD may determine one or more features common to both the first image data and the second image data by comparing features with respect to the portion of the image data identified by the neural network. In some examples, the features may be edges of the object. Edges of the object may be determined using an edge detection algorithm. To increase confidence that an edge within the portion is an edge of the object, edges may be filtered based on having a pixel length above a threshold length. The set of distances to the transparent coffee table may be used to determine an occupancy map that is indicative of an area occupied by the transparent coffee table within the physical space.

As described above, the occupancy map may be based on first occupancy data determined using active sensors and second occupancy data using passive sensors. Individual occupancy data based on both active and passive sensors may include an indication of a probability that an object is occupying an area of the physical space. The occupancy map may include a sum of the probabilities from the first occupancy data and the probabilities from the second occupancy data. By using both the active sensor and passive sensor, the AMD may increase the precision of the object location, shape, and size.

In some examples, active sensor data may not independently provide reliable indications of the presence of difficult-to-detect objects, but the active sensors may be used to increase or decrease the probability of an object occupying a location. For example, the active sensors may determine sensor data that indicates, with a second probability value, presence of an object within the physical space. The second probability value may be below an occupied threshold. The occupied threshold may be a probability above which the AMD bases navigation determinations as if the difficult-to-detect object were occupying an area of the physical space. However, if the first probability value is added to the second probability value, the combined probability value may be high. Given a high probability value, the AMD may determine to navigate around the indicated location of an object. Otherwise, using the first probability value alone, the AMD may risk navigating through the indicated location if other options are not available.

The techniques disclosed allow the AMD to safely navigate a physical space that includes objects that are difficult to detect. Based on image data from passive sensors, the AMD may use a combination of image-based techniques to detect objects that may be missed or unreliably detected by active sensors. Depth data determined from the image data may be used to navigate the AMD to determine additional depth data by approaching the object from different perspectives. Using sensor data from active sensors, the AMD may further increase confidence in objects detected using passive sensor data.

Illustrative System

FIG. 1 illustrates a system 100 for object detection in an autonomous mobile device (AMD) 104, according to some implementations.

The AMD 104 is depicted within a physical space 102 that includes an object 106. In this example, the object 106 is a class of object that is difficult to detect. The AMD 104 may include one or more processors 140, one or more motors 142, one or more sensors 144, an active sensor object detection module 146, a passive sensor object detection module 148, and memory 154. The one or more sensors 144 may include one or more active sensors and one or more passive sensors. The one or more sensors 144 may be fixed, with respect to the AMD 104, or may be movable with respect to the AMD 104. The memory 154 may include an occupancy map 156, image data 158, and sensor data 160. Sensor data 160 may include active sensor data 162 and passive sensor data 164. The occupancy map 156 may be based on first occupancy data determined using active sensors and second occupancy data using passive sensors. Occupancy data may indicate whether a cell in an occupancy map is indicative of a physical area associated with the cell being occupied by an object in the physical space 102. In some implementations, an indication of occupancy may be a probability value, ranging from zero to one. In other implementations, an indication of occupancy may be a first value for occupied, a second value for unoccupied, and a third value for unknown.

Individual occupancy data may be associated with individual techniques of determining probabilities of occupied cells of an occupancy map. For example, first occupancy data may be based on active sensor data 162, and second occupancy data may be based on passive sensor data 164. As the AMD 104 explores or determines additional active sensor data 162, one or more probabilities associated with cells of the occupancy data may be updated to indicate a change in probability due to the additional active sensor data 162. Similarly, as the AMD 104 explores or determines additional passive sensor data 164, one or more probabilities associated with cells of the occupancy data may be updated to indicate a change in probability due to the additional passive sensor data 164.

In one implementation, to make occupancy data for difficult-to-detect objects resilient to removal due to lack of detection based on active sensor data 162, probabilities determined for the first occupancy data based on active sensor data 162 are not used to determine probabilities for the second occupancy data. In this example, if the occupancy data is based on a sum of probabilities from the first occupancy data and the second occupancy data, then the occupancy map 156 may indicate the presence of an object 106 based on the first occupancy data. In contrast, in a different example, a cell of an occupancy map 156 may be determined to not be indicative of an object 106 occupying a physical area associated with the cell based on active sensors indicating the lack of presence of any objects 106 in the physical area. Continuing this example, by updating probabilities associated with different occupancy data separately, probabilities associated with given occupancy data may persist when different sources of sensor data are not in agreement with regard to whether an object 106 is present. In this way, objects that are difficult to detect may continue to be included in an occupancy map 156 when different sensors 144 provide different indications of whether an object 106 is present in the physical space 102.

In one implementation, instead of active sensor data 162 and passive sensor data 164 being used to determine independent occupancy data, threshold values may be used to determine whether sensor data 160 from the active sensors is used to modify the occupancy data based on passive sensor data 164. For example, an AMD 104 may explore a physical space 102 and use active sensor data 162 to determine first occupancy data and passive sensor data 164 to determine second occupancy data. In this example, the passive sensor data 164 may be indicative of a difficult-to-detect object. In this example, one or more cells indicating occupancy of the difficult-to-detect object may continue to indicate occupancy unless a confidence level of active sensor data 162 associated with the one or more cells is greater than a confidence threshold. The confidence threshold may be determined such that the confidence threshold is exceeded based on multiple measurements of the active sensors from multiple poses of the AMD 104. For example, a confidence level may be 60%. However, in other examples, the confidence level may be specified to be greater than or less than 60%.

The active sensor object detection module 146 may use active sensor data 162 from the one or more active sensors to determine the first occupancy data. Occupancy data may indicate, for each cell of an occupancy map 156, a probability that a given cell is occupied by an object 106. For example, the one or more active sensors may comprise a time-of-flight (TOF) depth camera, sonar, radar, LIDAR (light detection and ranging/laser imaging, detection, and ranging), ultrasonic, or other types of sensors 144 that emit and measure different types of signals. The sensor data 160 provided by an active sensor is indicative of whether an object 106 is detected or not, and also includes information about the distance between the active sensor and the object 106 and relative direction with respect to the active sensor and the object 106. Depth sensors such as ultrasonic sensors, optical sensors such as a TOF depth camera, LIDAR, radar, and so forth, may provide sensor data 160 that is indicative of the presence or absence of objects 106 in the physical space 102 within the active sensor field-of-view 108.

The one or more active sensors may have a field-of-view depicted as an active sensor field-of-view 108. The active sensor field-of-view 108 may be the field-of-view of a single active sensor or a combined field-of-view of multiple active sensors. In this example, the one or more active sensors determine active sensor data 162. A field-of-view may be the extent of the physical space 102 represented by sensor data 160 acquired using one or more sensors 144. Active sensor data 162 may indicate one or more distances based on one or more active sensor measurement points. An active sensor measurement point may be a measurement of an emitted signal that is reflected from the object 106. Each measurement point may be used to determine a distance from an active sensor on the AMD 104 to the object 106. An active sensor measurement point may be based on combined signal data from one or more emitted signals.

For example, an active sensor such as a TOF depth camera may emit a pulse of infrared light and use a return time for reflected light to determine a distance between the sensor 144 and the object 106 that reflected the light. The sensor data 160 may be expressed as point cloud data, volumetric data, bearing and distance data, and so forth. In this example, the active sensor data 162 includes distances {X1 . . . XN} based on sensor data 160 from the one or more active sensors. A probability value associated with an individual cell of the first occupancy data may be based on a quantity of measurement points associated with the cell and on the one or more confidence values associated with sensor data 160 from the measurement points. For illustration, a single active sensor measurement point is depicted reflecting from the object 106 in the physical space 102; however, more generally, hundreds or thousands of active sensor measurement points may be determined.

The passive sensor object detection module 148 includes a visual object class detection module 150 and a visual depth data module 152. The passive sensor object detection module 148 may use passive sensor data 164 to determine second occupancy data. Similar to the first occupancy data, the second occupancy data may indicate, for each cell of the occupancy map 156, a probability that a given cell is occupied by an object 106. A probability value associated with an individual cell of the second occupancy data may be based on a quantity of passive sensor measurement points associated with the cell. Passive sensor measurement points are described with respect to FIG. 6.

The visual object class detection module 150 may comprise a classifier, such as a trained neural network. The neural network is trained to identify difficult-to-detect objects based on the appearance of a difficult-to-detect object in image data 158. The neural network may determine a particular type of difficult-to-detect object, such as a mirror, dark-colored furniture, a transparent coffee table, or other type of furniture. Described below are implementations that describe various bases for determining that an object is difficult to detect.

In some implementations, a class of difficult-to-detect objects may represent objects that have at least some portions that produce sensor data with confidence values that are less than a confidence threshold. The sensor data may be sensor data from either passive sensors or active sensors. Another example class may be a normal class of object that is indicative of objects that are detected by active sensors with confidence thresholds that are equal to or greater than the confidence threshold. In some examples, a confidence threshold may be 95%. In other examples, the confidence threshold may be greater than or less than 95%.

In some implementations, an object may be difficult to detect based on a mismatch in effective sensor ranges. An effective sensor range may be associated with a field-of-view within which a sensor may determine sensor data having confidence values above a confidence threshold. For example, the active sensors may have a first field-of-view 108 and the passive sensors may have a second field-of-view 110. As illustrated in FIG. 1, the second field-of-view 110 includes areas and objects, or portions of objects, that are not within the first field-of-view 108. An object may be classified as difficult-to-detect based on being detectable by a first set of sensors but not a second set of sensors. In this example, a first set of distances may be based on the active sensor data 162, and a second set of distances may be based on the passive sensor data 164. In this example, because different parts of the object 106 are within the first field-of-view 108 and the second field-of-view 110, there may be a variance between the first set of distances and the second set of distances that is greater than a first threshold. Given a variance that is greater than the first threshold, the AMD 104 may determine that an area of the physical space 102 associated with the first and second sets of distances is occupied by an object that is difficult to detect.

In some implementations, an object may be difficult to detect based on being outside of a sensor range. For example, the active sensors may comprise time-of-flight (TOF) sensors with a signal range of N meters. As depicted in FIG. 1, the active sensors have a second field-of-view 110 that includes a portion, but not all of the object 106. Based on at least some portions of the object 106 being outside of the sensor range of the active sensors, with respect to the active sensors, the object 106 may be classified as difficult-to-detect.

In some implementations, a difficult-to-detect class of object may be difficult to detect using either active sensors or passive sensors. For example, an object may be difficult to detect if sensor data 160 from the active sensors does not indicate presence of the object 106. As another example, an object may be difficult to detect if sensor data from the active sensors indicates presence of the object 106 with a confidence value that is below a confidence threshold. A confidence threshold may be associated with a probability of an object being at a location that is more likely than not, or greater than 0.50. In other examples, a confidence threshold may be greater than or less than 0.50. As another example of a difficult-to-detect object, an object may be difficult to detect by an active sensor if a signal is emitted and measured data is not indicative of the object. For example, for active sensors such as time-of-flight sensors that emit wavelengths of light in the infrared or visible light spectrum, difficult-to-detect objects include transparent, partially transparent, or reflective objects, such as transparent furniture, windows, or mirrors. In some examples, whether an object is difficult to detect depends on a type of sensor and a type of signal emitted by the sensor. For example, for an ultrasonic sensor, a difficult-to-detect object may be furniture that is covered with a textile that diffuses sound waves.

In some implementations, the neural network may determine a first region of the image data that includes the difficult-to-detect object. For example, the neural network may determine a bounding box associated with pixels between the rows and columns of two pixel coordinates. For example, a first pixel coordinate may be (Px, Py), and a second pixel coordinate may be (Pr, Ps), and a bounding box may comprise pixels between rows Px and Pr and between columns Py and Ps. The pixels within the bounding box are representative of at least a portion of a difficult-to-detect object. In this example, the object 106 is at least partially transparent, and portions of the floor and wall are visible through the object depiction 114.

In this example, the visual object class detection module 150 uses first image data 112(1) and determines a bounding box 116. In this example, the first image data 112(1) is representative of a scene in the physical space 102 determined by one or more cameras at a first pose. Second image data 112(2) includes an object depiction 114 of the object 106 determined by the one or more cameras at a second pose. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes. A pose may be used to describe location and orientation of a camera and also the AMD 104.

In some implementations, as an AMD 104 changes poses, the one or more cameras also change poses. For example, if the AMD 104 changes poses by moving in a first direction by a number of meters, then the one or more cameras also change poses based on the number of meters moved by the AMD 104. Similarly, if the AMD 104 changes poses by rotating by a first number of degrees, then the one or more cameras change poses based on the first number of degrees of rotation.

In other implementations, the one or more cameras may change poses independently of the AMD 104. For example, the one or more cameras may be mounted on a telescoping mast of the AMD 104. The telescoping mast may move up or down independently of movement of a chassis of the AMD 104. For example, the AMD 104 may not move any wheels while the telescoping mast moves up or down. In another example, the one or more cameras may be articulated independently and may respectively change poses without the chassis of the AMD 104 changing poses. For example, the one or more cameras may respectively rotate in various directions to change individual poses of the one or more cameras.

In some implementations, the trained neural network may determine a segmentation map of the image data 112. The segmentation map may indicate a plurality of regions of pixels. Each region of the plurality of regions of pixels may be indicative of a respective class of object. Each region of the plurality of regions of pixels may comprise one or more contours that outline or enclose each respective region. An example class of object is a difficult-to-detect class of object, as described above.

In some implementations, probabilities associated with a cell in the occupancy map 156 may be used to determine a speed, a navigation path, or both speed and navigation paths. For example, the occupancy map 156 may have X ranges of probabilities. Each range of probabilities of the X ranges of probabilities may be delineated by a threshold probability. Each range of probabilities may be associated with an individual speed. For example, if X=3, there may be a first probability threshold, a second probability threshold, and a third probability threshold. The first probability threshold may be 0.95, the second probability threshold may be 0.60, and the third probability threshold may be 0.20. The first probability threshold is associated with a high likelihood of an object occupying a physical area associated with a cell of the occupancy map 156. The second probability threshold may be associated with a medium-high likelihood of an object occupying a physical area associated with a cell of the occupancy map 156. The third probability threshold may be associated with a low likelihood of an object occupying a physical area associated with a cell of the occupancy map 156. In different implementations, there may be additional probability thresholds, and different values for each probability threshold.

In this example, if a first probability associated with a first cell of the occupancy map 156 is greater than the first probability threshold, then the AMD 104 may determine a first speed when traveling within a threshold distance of the physical area associated with the first cell. If the first probability is greater than the second probability threshold and less than or equal to the first probability threshold, then the AMD 104 may determine a second speed when traveling within the threshold distance of the physical area associated with the first cell. If the first probability is greater than the third probability threshold and less than or equal to the second probability threshold, the AMD 104 may determine a third speed when traveling within the threshold distance of the physical area associated with the first cell. If the first probability is less than or equal to the third probability threshold, then the AMD 104 may determine a fourth speed when traveling within the threshold distance of the physical area associated with the first cell. In this example, the first speed may be less than the second speed, the second speed may be less than the third speed, and the third speed may be less than the fourth speed.

Continuing this example, each range of probabilities of the X ranges of probabilities may be associated with an individual navigation determination. For example, if the first probability is greater than the first probability threshold, then the AMD 104 may avoid a physical area associated with the first cell. In this scenario, because the likelihood of an object being present is high, the AMD 104 avoids the physical area to reduce the possibility of colliding with an object. If the first probability is greater than the second probability threshold and less than or equal to the first probability threshold, then the AMD 104 may determine to navigate through the physical area associated with the first cell if probabilities of adjacent cells are the same or greater. In this scenario, while there is some uncertainty with regard to the presence of an object in the physical area, there is not enough uncertainty to completely avoid the physical area. If the first probability is less than or equal to the third probability, then the AMD 104 may determine navigation paths that intersect with the physical area associated with the first cell. In this scenario, because there is a low likelihood of an object being present in the physical area, the AMD 104 may determine navigation paths as if the physical area were unoccupied.

The passive sensor object detection module 148 also includes the visual depth data module 152. The visual depth data module 152 may determine a first one or more features of the first region, and a bounding box 116, determined by the visual object class detection module 150. The first image data 112(1) may be determined from a first camera at a first pose. Second image data 112(2) may be determined from a second camera at a second pose. A stereocamera may comprise the first camera and the second camera. In one implementation, the first camera and the second camera may be fixed with respect to a chassis of the AMD 104. In another implementation, the first camera and the second camera may be moveable with respect to the chassis. The one or more passive sensors may comprise the stereocamera. The visual depth data module 152 may use an edge detection algorithm for a first portion of the first image data 112(1) within the bounding box 116 and determine a first one or more edges. In other examples, the visual depth data module 152 may use a mono camera. In this example, to determine first image data 112(1) at a first pose and second image data 112(2) at a second pose, the AMD 104 determines the first image data 112(1) at a first time. The first pose is the pose at the first time. To determine the second image data 112(2) at a second pose, the AMD 104 determines the second image data 112(2) at a second time after the AMD 104 has changed locations, changed orientation, or both changed location and orientation. The difference in location, orientation, or both location and orientation is used to determine the second pose for the second image data 112(2). Given two images at two poses, the visual depth data module 152 may determine distance data similarly to the scenario based on a stereocamera. In another example, the visual depth data module 152 may use stadiametric rangefinding techniques. For example, the visual object class detection module 150 may determine and classify an object depiction as a difficult-to-detect object. The visual object class detection module 150 may also determine semantic information associated with the object, such as a type of furniture. Each type of object may have associated physical dimensions. For different types of objects, the visual depth data module 152 may determine one or more distances based on associated physical dimensions of the object, a field-of-view of the one or more cameras, and a proportion of the image data 158 that includes the object depiction 114. To increase a confidence that an edge is part of an object, the first one or more features may be determined to be edges that include are longer than a threshold number of pixels.

The visual depth data module 152 may determine depth data indicative of the second one or more distances {Y1 . . . YN} using stereovision techniques on the first image data 112(1) determined at the first pose and the second image data 112(2) determined at the second pose. For example, the visual depth data module 152 may determine a second portion of pixels within the second image data 112(2) associated with pixel coordinates of the bounding box 116. The visual depth data module 152 may use the edge detection algorithm for the second portion of the second image data 112(2) and determine a second one or more edges. To increase a confidence that an edge is part of an object, the second one or more features may be determined to be edges that include or are longer than the threshold number of pixels.

In some implementations, in addition to or instead of filtering out edges that are not longer than the threshold number of pixels, the visual depth data module 152 may filter out edges based on one or more characteristics. For example, the visual depth data module 152 may filter to determine the first set of features based on edges that are vertical. Vertical may be specified to be an orientation that is within a first threshold number of degrees of a normal to a surface of the physical area 102. For example, the first threshold number may be 10 degrees, and an edge is determined to be vertical if the edge is between 80 and 100 degrees from the surface, where the normal is 90 degrees from the surface. In another implementation, vertical may be specified as an edge having an orientation that is within a threshold number of degrees of a column of pixels in the image data 112. For example, an edge may be determined to be vertical if the edge has a slope with respect to the rows and columns of the image that is between 80 and 100 degrees relative to horizontal. Vertical edges may be used to determine the first set of features based on vertical edges of an object depiction 114 being more prominent, and consequently, more reliable by being associated with higher confidence values than confidence values for horizontal edges.

In some implementations, the accuracy of the stereovision technique for determining distance data from the set of features may improve by using vertical edges in cases where the first and second cameras are separated along a horizontal axis. In this implementation, a horizontal axis may be determined to be horizontal based on the horizontal axis being perpendicular within a second threshold number of degrees relative to the above definition of vertical. As described below, a first set of features from first image data are matched to a second set of features from second image data. Based on the first and second sets of features including vertical edges, the relative location of the matching features along a horizontal axis of the image data 112 may be more accurate.

Continuing with this example, a first set of pixels associated with the first set of features may be determined to be similar within a threshold variance with a second set of pixels associated with the second set of features. The threshold variance may be indicative of one or more of: a color value, a brightness value, or an intensity value. In this example, the difference in pixel coordinates between the first set of pixels and the second set of pixels may be used with respect to a relative difference between the first pose and the second pose to determine distance data associated with each of the first set of pixels or the second set of pixels.

The AMD 104 may use the first occupancy data and second occupancy data to determine the occupancy map 156 to indicate the object representation 120 and the object representation 122. The first occupancy data is based on the active sensor data 162, and the second occupancy data is based on the passive sensor data 164. Object representation 120 is based on the active sensor data 162, and object representation 122 is based on the passive sensor data 164. In this example, due to the object 106 being a class of object that is difficult to detect, the active sensor data 162 is indicative of a portion of the object 106.

In some implementations, instructions to move the AMD 104 may be based at least in part on a likelihood that the object 106 is present in an area of the physical space 102. For example, as described above, the first set of distances for a first area in the physical space 102 may be used to determine the first occupancy data. The first occupancy data may be indicative of a first set of occupied cells of the occupancy map 156, depicted as the occupied cells associated with the object representation 120. Continuing this example, as described above, the second set of distances for the first area may be used to determine the second occupancy data. The second occupancy data may be indicative of a second set of occupied cells of the occupancy map 156, depicted as the occupied cells associated with object representation 122.

Continuing this implementation, the AMD 104 may determine a variance between a number of cells within the first area that are indicated as occupied by the first set of occupied cells and a number of cells indicated as occupied by the second set of occupied cells in the first area. Based on the variance, a value may be determined that is indicative of a likelihood that an object 106 is present within the area of the physical space 102. For example, if there is a small variance between the number of occupied cells indicated by the first set of occupied cells and the second set of occupied cells, then there is a high likelihood that an object 106 is present in the area of the physical space 102. A variance may be indicative of an amount of overlap in the occupied cells indicated by the first set of distances and indicated by the second set of distances. In this example, the greater the variance, the less overlap in occupied cells, and the lower the likelihood of an object 106 being present in the area. Similarly, the smaller the variance, the greater the overlap in occupied cells, and the greater the likelihood of an object 106 being present in the area.

Continuing this implementation, as noted above, the instructions to move the AMD 104 may be based at least in part on the likelihood that the object 106 is present in the area of the physical space 102. In this example, if the variance is less than a first threshold, then the likelihood may be determined to be a first value. Based on the first value, the AMD 104 may determine a navigation path that avoids the area of the physical space 102. Continuing this example, if the variance is greater than or equal to the first threshold, then the likelihood may be determined to be a second value.

Based on the second value, the AMD 104 may determine a navigation path that slows down, but does not avoid, the area of the physical space 102. In other examples, there may be additional thresholds that are associated with different likelihoods of presence of an object 106. The AMD 104 may use the different likelihoods to determine different ranges of operating speeds and different navigation determinations.

In some implementations, an object may be difficult to detect based on active sensor data 162 indicating less than a threshold area of the occupied area of the object. For example, the threshold area may be less than 10%. In other examples, the threshold area may be greater or less. In this example, the object representation 120 is indicative of a portion of an area occupied by the object 106 that is less than the area occupied by the object 106 in the physical space 102.

In some implementations, an object 106 may be difficult to detect based on the active sensors determining sensor data 160 associated with multiple measurement points associated with less than a threshold amount of the surface area of the object 106. For example, if the active sensor detects a small part, or less than a threshold amount of the object 106, then the object 106 may be a class of object that is difficult to detect. The threshold amount may be an area that provides at least some depth data for one or more of: a width, a height, or a length of an object. The depth data may be used to determine a point cloud that represents the shape, size, and depth of the object. In this example, because the object 106 is difficult-to-detect, the depth data determined from the active sensors represents a portion of the object 106 that is less than the threshold amount of the surface area of the object 106. As depicted, active sensor data 162 includes depth data indicated by distances {X1 . . . XN}.

In this example, the object representation 122 based on the passive sensor data 164 is greater than a physical area occupied by the object 106 in the physical space 102. The object representation 122 may be greater based on depth data being determined for objects within the bounding box 116 that are behind, but visible through, the object 106. For example, if the visual depth data module 152 uses edge detection to determine features, and the edge is for an object behind the object 106, then the distance to the object behind the object 106 may be used to determine the second occupancy data.

The occupancy map 156 may be determined based on a combination of the first occupancy data and the second occupancy data. Individual occupancy data based on both active and passive sensors may include an indication of a probability that an object 106 is occupying an area of the physical space 102. The occupancy map 156 may include a sum of the probabilities from the first occupancy data and the probabilities from the second occupancy data. By using both the active sensor and passive sensor, the AMD 104 may increase the precision of the object location, shape, and size. In this example, the probability from the first occupancy data and the second occupancy data associated with the object representation 120 is a sum, the probability is greater than the probabilities associated with the cells of the object representation 122 that exclude the cell associated with the object representation 120. Because the probability of the cell associated with object representation 120 is higher, there is a greater confidence that the cell is occupied.

In the implementation shown here, the occupancy map 156 comprises cells in a specified arrangement, a grid of cells. Each cell may be represented by an index value indicative of that cell within the grid. Each cell is associated with a particular location in the physical space 102. For example, each cell may represent an area in the physical space 102 that is 5 centimeters (cm) by 5 cm. In some implementations, instead of probabilities, each cell may also be associated with an occupancy value that indicates whether the particular area in the physical space 102 associated with that cell is occupied by an object, unoccupied, or whether there is no data that is associated with that cell being unobserved. For example, an occupancy value of −1 may indicate an unoccupied cell with no object, an occupancy value of 0 indicates the cell has been unobserved, while +1 indicates the cell is occupied by an object. For ease of discussion, and not necessarily as a limitation, description with regard to cells may refer to the data associated with the cells or, as appropriate, the physical space associated with the cell. For example, an action such as moving to a cell may comprise moving the AMD 104 to the physical space 102 associated with the cell.

The AMD 104 may include one or more passive sensors. The one or more passive sensors may be passive in that they do not emit a signal into a surrounding physical environment or determine a measurement of the emitted signal. In one example, the one or more passive sensors may comprise stereo cameras. In another example, the one or more passive sensors may comprise a single camera. The one or more passive sensors may detect different ranges of electromagnetic wavelengths. For example, the one or more passive sensors may include a camera that detects ultraviolet wavelengths, infrared wavelengths, and so forth. In some examples, the one or more cameras may detect electromagnetic wavelengths from terahertz to ultraviolet. The passive sensor field-of-view 110 may be the field-of-view of a single passive sensor or a combined field-of-view of multiple passive sensors.

Given determination of occupancy map 156 based on the first occupancy data and the second occupancy data, the AMD 104 may use the occupancy map 156 to navigate, determine a speed to move, and so forth.

The AMD 104 may be configured to dock or connect to a dock 180. The dock 180 may provide external power which the AMD 104 may use to charge a battery of the AMD 104.

The AMD 104 may include battery(s) to provide electrical power for operation of the AMD 104. The battery may be rechargeable, allowing it to store electrical energy obtained from an external source. In other implementations, a wireless power receiver may be used to provide power for operation of the AMD 104, recharge the battery, and so forth.

One or more motors 142 or other actuators enable the AMD 104 to move from one location in the physical space 102 to another. For example, a motor 142 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 includes one or more memories 154. The memory 154 may comprise one or more non-transitory computer-readable storage media (CRSM).

The AMD 104 may include one or more sensors 144. For example, the sensors 144 may include microphones, time-of-flight (TOF) sensors cameras, LIDAR, inductive sensors, and so forth. The sensors 144 may generate sensor data 160 and the inductive sensors may generate signal data indicative of measured signal strength. The sensors 144 are discussed in more detail with regard to FIG. 3.

The AMD 104 may use network interfaces to connect to a network 182. For example, the network 182 may comprise a wireless local area network, that in turn is connected to a wide area network such as the Internet.

The dock 180 may also be connected to the network 182. For example, the dock 180 may be configured to connect to the wireless local area network 182 such that the dock 180 and the AMD 104 may communicate.

The AMD 104 may access one or more servers 184 via the network 182. For example, the AMD 104 may utilize a wakeword detection module to determine if a user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 184 for further processing. The servers 184 may process the spoken audio and return to the AMD 104 data that may be subsequently used to operate the AMD 104.

The AMD 104 may also communicate with other devices 186. The other devices 186 may include one or more devices that are within the physical space 102 such as a home, or associated with operation of one or more devices in the physical space 102. For example, the other devices 186 may include a doorbell camera, a garage door opener, a refrigerator, washing machine, and so forth. In some implementations the other devices 186 may include other AMDs 104, vehicles, and so forth.

Figure 2:
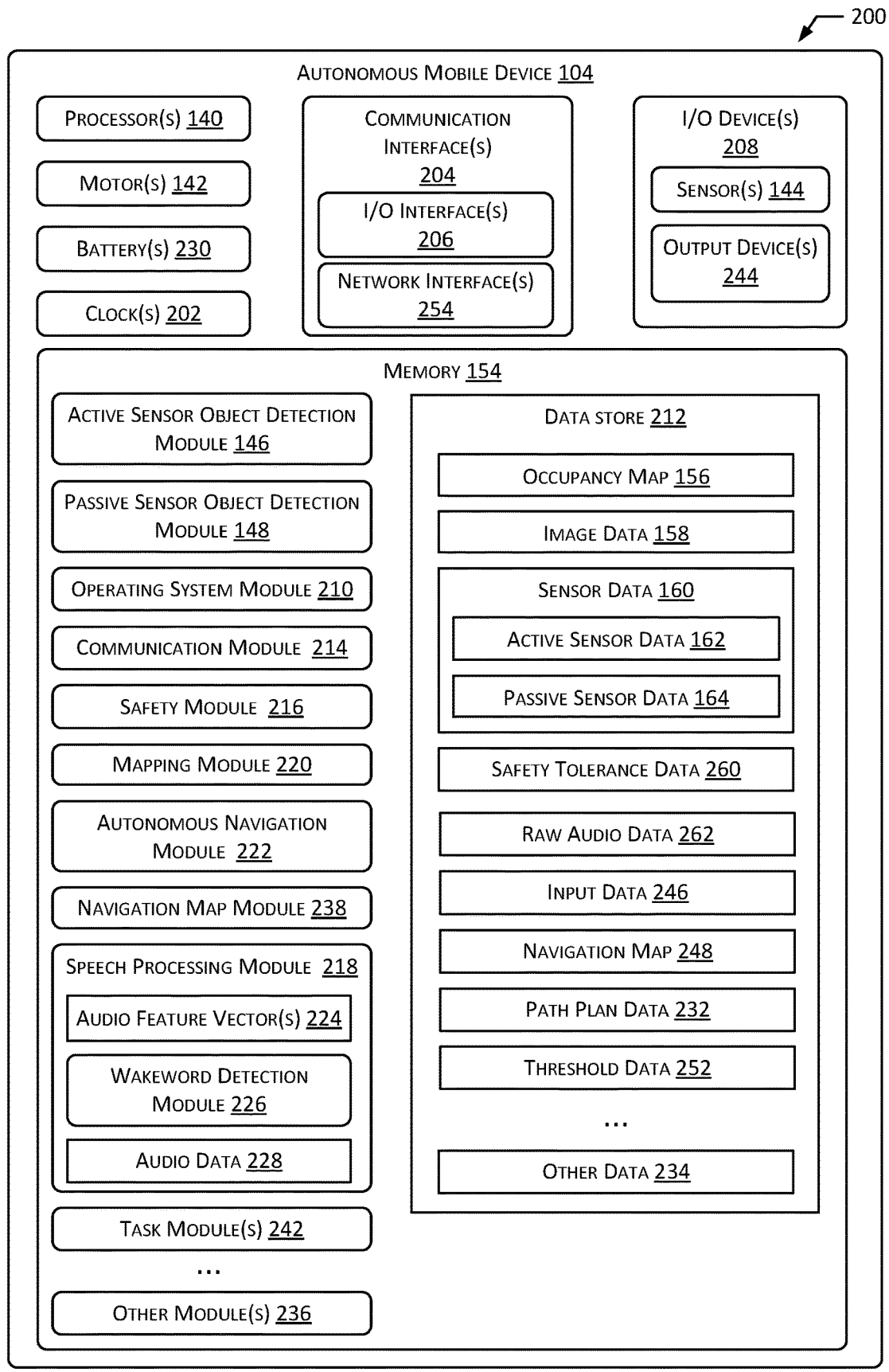
FIG. 2 is a block diagram of the components of the AMD, according to some implementations.

FIG. 2 is a block diagram 200 of the components of the AMD 104, according to some implementations.

The AMD 104 may include one or more batteries 230 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more network interfaces 254. The network interfaces 254 may include devices to connect to personal area networks (PANS), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth.

During operation, the AMD 104 may determine input data 246. The input data 246 may include or be based at least in part on sensor data 160 from the sensors 144 onboard the AMD 104. In one implementation, a speech processing module 218 may process raw audio data 262 obtained by a microphone on the AMD 104 and produce input data 246. For example, a user may say "robot, come here" which may produce input data 246 "come here". In another implementation, the input data 246 may comprise information such as a command provided by another computing device, such as a smartphone or tablet computer.

A mapping module 220 determines a representation of the physical space 102 that includes obstacles and their locations in the physical space 102. During operation, the mapping module 220 uses the sensor data 160 from various sensors 144 to determine information such as where the AMD 104 is, how far the AMD 104 has moved, the presence of obstacles, where those obstacles are, and so forth.

The mapping module 220 uses a simultaneous localization and mapping (SLAM) module. Localization is determining where the AMD 104 is in the physical space 102 and may utilize some external reference. For example, cameras may determine images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module may provide as output a series of poses, each pose describing a location and rotations in the physical space 102. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. At successive times, and as the AMD 104 moves and additional images are determined from locations in the physical space 102, the apparent change in position of the same feature across the additional images may be used to determine subsequent poses. In some implementations, an orientation may comprise information about six dimensions (6D), that of three orthogonal axes and corresponding rotations about those axes.

The SLAM module may also use data from other sensors 144 such as motor encoders, inertial measurement units (IMU) with one or more accelerometers and gyroscopes, and so forth. An IMU may comprise a tilt sensor. For example, inertial data indicative of rotations, accelerations along particular axes, and so forth obtained from the IMU may be integrated to provide information about the movement of the AMD 104.

A set of poses generated by the SLAM module over time may describe a given AMD 104 trajectory. For example, trajectory data may comprise a time series of pose data from the SLAM module.

While the AMD 104 is operating, the sensors 144 may be used to determine sensor data 160 comprising information about the physical space 102. In addition to cameras, the AMD 104 may include depth sensors that may determine depth data about the presence or absence of obstacles in the physical space 102, and so forth. For example, the sensors 144 may comprise active sensors, such as time-of-flight (TOF) depth camera, ultrasound, radar, and so forth. The depth data is indicative of whether an obstacle is detected or not and includes information about the distance between the sensor 144 and the obstacle and the relative direction with respect to the sensor 144 of an obstacle, if detected.

The sensor data 160 may be processed to determine occupancy data. The occupancy data is indicative of a particular area in the physical space 102, relative to the pose of the AMD 104 at the time the sensor data 160 was determined, and whether that area contains an obstacle or is determined to be free from obstacles.

The occupancy map 156 may be manually or automatically determined as part of an exploration process. This exploration may include an explicit exploration in which the AMD 104 moves through the physical space 102 or may be incidental exploration to movement of the AMD 104. For example, explicit exploration may involve the AMD 104 starting with no occupancy map 156 and moving throughout the physical space 102 to determine occupancy data and the corresponding occupancy map 156. In another example, incidental exploration may involve the AMD 104 following the user. Continuing the example, during a learning phase the user may take the AMD 104 on a tour of the physical space 102, allowing the mapping module 220 of the AMD 104 to determine occupancy data and the corresponding occupancy map 156. The user may provide input data 246 such as tags or other semantic data that designates a particular obstacle type, such as "furniture" or "fragile". In another example, during subsequent operation, the AMD 104 may generate the occupancy map 156 that is indicative of locations and types of obstacles such as chairs, doors, stairwells, and so forth as it moves unattended through the physical space 102.

Modules described herein, such as the mapping module 220, may provide various processing functions such as de-noising, filtering, and so forth. Processing of sensor data 160, such as image data 158 from a camera, may be performed by a module implementing, at least in part, one or more of the following tools or techniques. In one implementation, processing of image data 158 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 160. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 160 or other data. For example, the ANN may be trained using a supervised learning algorithm such that object identifiers are associated with images of particular objects within training images provided to the ANN. Once trained, the ANN may be provided with the sensor data 160 and produce output indicative of the object identifier.

A navigation map module 238 uses the occupancy map 156 as input to generate a navigation map 248. For example, the navigation map module 238 may produce the navigation map 248 by inflating or enlarging the apparent size of obstacles as indicated by the occupancy map 156.

The AMD 104 autonomous navigation module 222 may generate path plan data 232 that is indicative of a path through the physical space 102 from the current location to a destination location. The AMD 104 may then begin moving along the path.

While moving along the path, the AMD 104 may assess the physical space 102 and update or change the path as appropriate. For example, if an obstacle appears in the path, the mapping module 220 may determine the presence of the obstacle as represented in the occupancy map 156 and navigation map 248. The now updated navigation map 248 may then be used to plan an alternative path to the destination location.

The AMD 104 may utilize one or more task modules 242. The task module 242 comprises instructions that, when executed, provide one or more functions. The task modules 242 may perform functions such as finding a user, following a user, presenting output on output devices 244 of the AMD 104, performing sentry tasks by moving the AMD 104 through the physical space 102 to determine the presence of unauthorized people, and so forth.

The AMD 104 includes one or more output devices 244, such as one or more of a motor 142, light, speaker, display, projector, printer, and so forth. The one or more output devices 244 may be used to provide output during operation of the AMD 104. The output devices 244 are discussed in more detail with regard to FIG. 3.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

One or more clocks 202 may provide information indicative of date, time, ticks, and so forth. For example, the processor 140 may use data from the clock 202 to associate a particular time with an action, sensor data 160, and so forth.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 254, and so forth. The communication interfaces 204 enable the AMD 104, or components thereof, to communicate with other devices 186 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 144, keyboard, mouse, scanner, and so forth. The I/O devices 208 may also include output devices 244 such as one or more of a motor 142, light, speaker, display, projector, printer, and so forth. In some embodiments, the I/O devices 208 may be physically incorporated with the AMD 104 or may be externally placed.

The network interfaces 254 may be configured to provide communications between the AMD 104 and other devices 186 such as other AMDs 104, the dock 180, routers, access points, and so forth. The network interfaces 254 may include devices configured to couple to personal area networks (PANS), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 154. The memory 154 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 154 provides storage of computer-readable instructions, data structures, program modules, and other data for the operation of the AMD 104. A few example functional modules are shown stored in the memory 154, although the same functionality may alternatively be implemented in hardware, firmware, or as a system on a chip (SoC).

The memory 154 may include at least one operating system (OS) module 210. The OS module 210 is configured to manage hardware resource devices such as the I/O interfaces 206, the I/O devices 208, the communication interfaces 204, and provide various services to applications or modules executing on the processors 140. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 154 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 186 including other AMDs 104, servers 184, network attached storage devices, and so forth.

A communication module 214 may be configured to establish communication with other devices 186, such as other AMDs 104, an external server 184, a dock 180, and so forth. The communications may be authenticated, encrypted, and so forth.

Other modules within the memory 154 may include a safety module 216, the mapping module 220, the navigation map module 238, the autonomous navigation module 222, the one or more task modules 242, a speech processing module 218, or other modules 236. The modules may access data stored within the data store 212, including safety tolerance data 260, sensor data 160, other data 234, and so forth.

The safety module 216 may access the safety tolerance data 260 to determine within what tolerances the AMD 104 may operate safely within the physical space 102. For example, the safety module 216 may be configured to stop the AMD 104 from moving when an extensible mast of the AMD 104 is extended. In another example, the safety tolerance data 260 may specify a minimum sound threshold which, when exceeded, stops all movement of the AMD 104. Continuing this example, detection of sound such as a human yell would stop the AMD 104.

The safety module 216 may include the speed limit module. The safety tolerance data 260 may include one or more of the thresholds used by the speed limit module. In the event the speed limit module determines a stop state, movement of the AMD 104 may be stopped by one or more of inhibiting operations of one or more of the motors 142, issuing a command to stop motor operation, disconnecting power from one or more the motors 142, and so forth. The safety module 216 may be implemented as hardware, software, or a combination thereof.

The safety module 216 may control other factors, such as a maximum speed of the AMD 104 based on information obtained by the sensors 144, precision and accuracy of the sensor data 160, and so forth. For example, detection of an object 106 by an optical sensor may include some error, such as when the distance to an object 106 comprises a weighted average between the object and a background. As a result, the maximum speed permitted by the safety module 216 may be based on one or more factors such as the weight of the AMD 104, nature of the floor, distance to the object 106, and so forth. In the event that the maximum permissible speed differs from the maximum speed permitted by the safety module 216, the lesser speed may be utilized. In some implementations, a range of speed permitted for the AMD 104 at a particular time may be based on the AMD 104 being within a threshold proximity to a physical area occupied by a difficult-to-detect object. Presence of a difficult-to-detect object may be based on one or more cells of the occupancy map 156 indicating that the physical area is occupied with a probability greater than a threshold. For example, as discussed with respect to FIG. 1, probabilities associated with a cell in the occupancy map 156 may be used to determine a speed of the AMC 104. For example, the occupancy map 156 may have X ranges of probabilities. Each range of probabilities of the X ranges of probabilities may be delineated by a threshold probability. Each range of probabilities may be associated with an individual speed. For example, if X=3, there may be a first probability threshold, a second probability threshold, and a third probability threshold. The first probability threshold may be 0.95, the second probability threshold may be 0.60, and the third probability threshold may be 0.20. The first probability threshold is associated with a high likelihood of an object 106 occupying a cell of the occupancy map 156. The second probability threshold may be associated with a medium-high likelihood of an object 106 occupying a cell of the occupancy map 156. The third probability threshold may be associated with a low likelihood of an object 106 occupying a cell of the occupancy map 156. In different implementations, there may be additional probability thresholds, and different values for each probability threshold.

Continuing this example, if a first probability associated with a first cell of the occupancy map 156 is greater than the first probability threshold, then the AMD 104 may determine a first speed when traveling within a threshold distance of the physical area associated with the first cell. If the first probability is greater than the second probability threshold and less than or equal to the first probability threshold, then the AMD 104 may determine a second speed when traveling within the threshold distance of the physical area associated with the first cell. If the first probability is greater than the third probability threshold and less than or equal to the second probability threshold, the AMD 104 may determine a third speed when traveling within the threshold distance of the physical area associated with the first cell. If the first probability is less than or equal to the third probability threshold, then the AMD 104 may determine a fourth speed when traveling within the threshold distance of the physical area associated with the first cell. In this example, the first speed may be less than the second speed, the second speed may be less than the third speed, and the third speed may be less than the fourth speed.

One or more inflation parameters may be used during operation. The inflation parameters provide information such as inflation distance, inflation adjustment values, and so forth. In some implementations, the inflation parameters may be based at least in part on the sensor FOV, sensor blind spot, physical dimensions of the AMD 104, and so forth.

The speech processing module 218 may be used to process utterances of the user. Microphones may determine audio in the presence of the AMD 104 and may send raw audio data 262 to an acoustic front end (AFE). The AFE may transform the raw audio data 262 (for example, a single-channel, 16-bit audio stream sampled at 16 kHz), determined by the microphone, into audio feature vectors 224 that may ultimately be used for processing by various components, such as a wakeword detection module 226, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 182 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 224) representing features/qualities of the raw audio data 262 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 262) may be input into a wakeword detection module 226 that is configured to detect keywords spoken in the audio. The wakeword detection module 226 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning, or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 262 or the audio feature vectors 224) to one or more server(s) 184 for speech processing. The audio data 228 corresponding to audio obtained by the microphone may be processed locally on one or more of the processors 140, sent to a server 184 for routing to a recipient device, or may be sent to the server 184 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 238, before sending to the server 184, and so forth.

The speech processing module 218 may include or access an automated speech recognition (ASR) module. The ASR module may accept as input raw audio data 262, audio feature vectors 224, or other sensor data 160 and so forth and may produce as output the input data 246 comprising a text string or other data representation. The input data 246 comprising the text string or other data representation may be processed by the navigation map module 238 to determine the command to be executed. For example, the utterance of the command "robot, come here" may result in input data 246 comprising the text string "come here". The wakeword "robot" may be omitted from the input data 246.

An autonomous navigation module 222 provides the AMD 104 with the ability to navigate within the physical space 102 without real-time human interaction. The autonomous navigation module 222 may implement, or operate in conjunction with, the mapping module to determine one or more of an occupancy map 156, a navigation map 248, or other representations of the physical space 102. The AMD 104 may move through the physical space 102. The motion of the AMD 104 may be described as a trajectory. In some implementations the trajectory may include a series of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes.

The mapping module 220 may use one or more simultaneous localization and mapping ("SLAM") techniques. The SLAM algorithms may utilize one or more of maps, algorithms, beacons, or other techniques to navigate. The autonomous navigation module 222 may use the navigation map 248 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 142 connected to the wheels. For example, the autonomous navigation module 222 may determine the current location within the physical space 102 and determine path plan data 232 that describes the path to a destination location.

The AMD 104 may use the autonomous navigation module 222 to navigate to a docking area that includes the dock 180. For example, if the AMD 104 determines to recharge one or more batteries 230, then the AMD 104 may use path plan data 232 to navigate to a destination location that is in front of the dock 180. The autonomous navigation module 222 may utilize various techniques during processing of sensor data 160. For example, image data 158 obtained from cameras on the AMD 104 may be processed to determine one or more of corners, edges, planes, and so forth. In some implementations, corners may be detected, and the coordinates of those corners may be used to produce point cloud data. This point cloud data may then be used for SLAM or other purposes associated with mapping, navigation, and so forth.

The AMD 104 may move responsive to a determination made by an onboard processor 140, in response to a command received from one or more communication interfaces 204, as determined from the sensor data 160, and so forth. For example, an external server 184 may send a command that is received using the network interface 254. This command may direct the AMD 104 to proceed to find a particular user, follow a particular user, and so forth. The AMD 104 may then process this command and use the autonomous navigation module 222 to determine the directions and distances associated with carrying out the command. For example, the command to "come here" may result in the task module 242 sending a command to the autonomous navigation module 222 to move the AMD 104 to a particular location near the user and orient the AMD 104 in a particular direction.

The AMD 104 may connect to the network 182 using one or more of the network interfaces 254. In some implementations, one or more of the modules or other functions described here may execute on the processors 140 of the AMD 104, on the server 184, or a combination thereof. For example, one or more servers 184 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth. The data store 212 may also store values for various thresholds such as threshold data 252.

Figure 3:
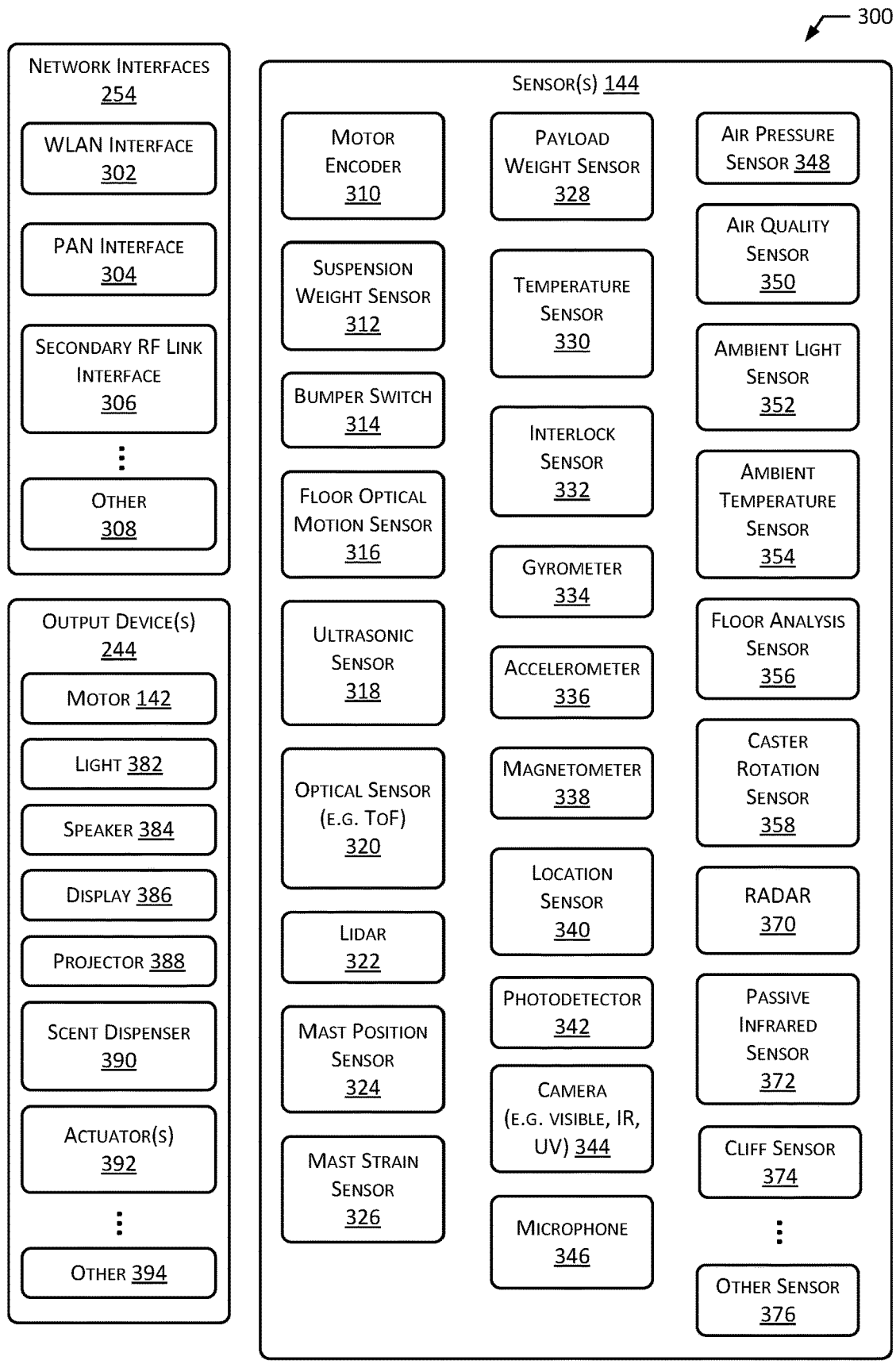
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 254, output devices 244, or sensors 144 depicted here, or may utilize components not pictured. One or more of the sensors 144, output devices 244, or a combination thereof may be included on a moveable component that may be panned, tilted, rotated, or any combination thereof with respect to a chassis of the AMD 104.

The network interfaces 254 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 186 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, dock 180, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 144. The sensors 144 depicted here are provided by way of illustration and not necessarily as a limitation. It is understood that other sensors 144 may be included or utilized by the AMD 104, while some sensors 144 may be omitted in some configurations.

A motor encoder 310 provides information indicative of the rotation or linear extension of a motor 142. The motor 142 may comprise a rotary motor, or a linear actuator. In some implementations, the motor encoder 310 may comprise a separate assembly such as a photodiode and encoder wheel that is affixed to the motor 142. In other implementations, the motor encoder 310 may comprise circuitry configured to drive the motor 142. For example, the autonomous navigation module 222 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 142. For example, if the suspension weight sensor 312 indicates no weight on the suspension, the implication is that the AMD 104 is no longer resting on its wheels, and thus operation of the motors 142 may be inhibited. In another example, if the suspension weight sensor 312 indicates weight that exceeds a threshold value, the implication is that something heavy is resting on the AMD 104 and thus operation of the motors 142 may be inhibited. For example, the threshold value may comprise a weight of a load that compresses a suspension system to a minimum height, or results in a mass that exceeds a torque output of the motors 142 to maintain a minimum acceleration.

One or more bumper switches 314 provide an indication of physical contact between a bumper or other member that is in mechanical contact with the bumper switch 314. The safety module 216 utilizes sensor data 160 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 144 to an object. The one or more active sensors may comprise the ultrasonic sensor 318. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field-of-view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 160 indicative of one or more of a presence or absence of an object, a distance to the object, or characteristics of the object. The one or more active sensors may comprise one or more optical sensors 320. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field-of-view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. The one or more active sensors may comprise the optical emitter. A portion of the structured light pattern may then be detected on the object using a sensor 144 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 222 may utilize the sensor data 160 indicative of the distance to an object 106 in order to prevent a collision with that object 106.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A LIDAR 322 sensor provides information indicative of a distance to an object or portion thereof by utilizing laser light. The one or more active sensors may comprise the LIDAR 322 The laser is scanned across a scene at various points, emitting pulses which may be reflected by objects 106 within the scene. Based on the time-of-flight distance to that particular point, sensor data 160 may be generated that is indicative of the presence of objects 106 and the relative positions, shapes, and so forth that are visible to the lidar 322. Data from the lidar 322 may be used by various modules. For example, the autonomous navigation module 222 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 216 may utilize sensor data 160 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 230, one or more motors 142, and so forth. In the event the temperature exceeds a threshold value, the component associated with that device temperature sensor 330 may be shut down. For example, the threshold value may be determined based on component specifications, such as a maximum permissible temperature of the batteries 230.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 160 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 160 indicative of impinging light. For example, the photodetector 342 may provide data indicative of a color, intensity, duration, and so forth.

A camera 344 generates sensor data 160 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 160 comprising images being sent to the autonomous navigation module 222. In another example, the camera 344 may comprise a 10 megapixel or greater camera that is used for videoconferencing or for acquiring pictures for the user. The one or more passive sensors may comprise one or more cameras 344.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 222 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 222, the task module 242, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 144 may include a radar 370. The one or more active sensors may comprise radar 370. The radar 370 may be used to provide information as to a distance, lateral position, and so forth, to an object 106.

The sensors 144 may include a passive infrared (PIR) sensor 372. The PIR 372 sensor may be used to detect the presence of users, pets, hotspots, and so forth. For example, the PIR sensor 372 may be configured to detect infrared radiation with wavelengths between 8 and 14 micrometers.

A cliff sensor 374 may comprise an optical sensor 320. The AMD 104 may have one or more cliff sensors 374 located on a front portion of the AMD 104. For example, cliff sensors 374 may be time-of-flight sensors that have a field-of-view directed downward toward a floor over which the AMD 104 is moving.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 102 to provide landmarks for the autonomous navigation module 222. One or more touch sensors may be utilized to determine contact with a user or other objects.

The AMD 104 may include one or more output devices 244. A motor 142 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 142 with an eccentric weight may be used to create a buzz or vibration to allow the AMD 104 to simulate the purr of a cat.

Figure 4:
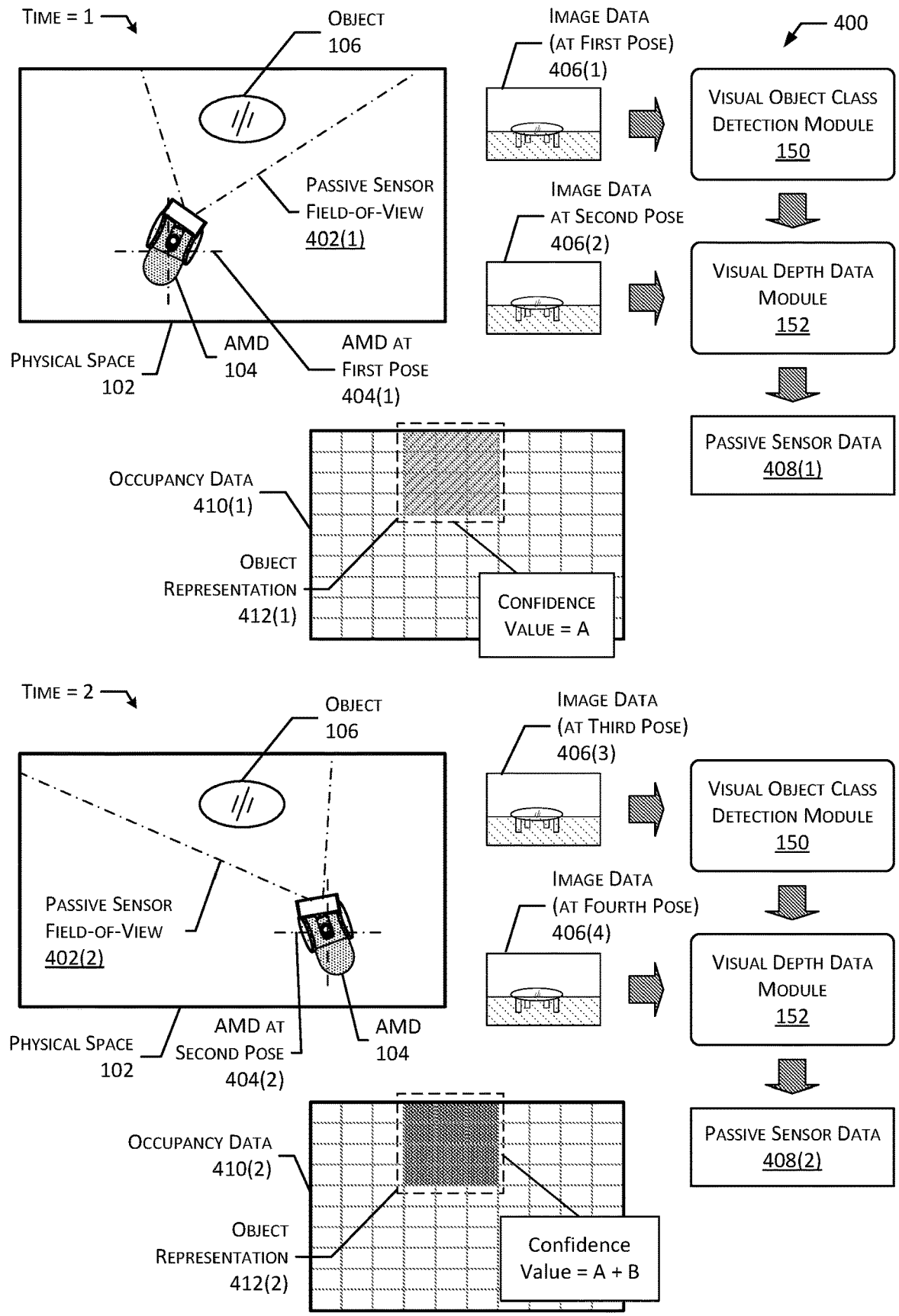
FIG. 4 illustrates passive sensor object detection, according to some implementations.

FIG. 4 illustrates, at 400, passive sensor object detection, according to some implementations.

In this example, the AMD 104 uses passive sensor data from multiple camera 344 poses and multiple AMD 104 poses to increase confidence in a determination of an object 106 occupying a physical area of the physical space 102. As described with respect to FIG. 1, the AMD 104 may use a passive sensor object detection module 148 to determine second occupancy data indicative of probabilities that an object 106 is occupying a physical area associated with cells of an occupancy map 156. The passive sensor object detection module 148 may include the visual object class detection module 150 and the visual depth data module 152.

In some implementations, occupancy data based on sensor data from active sensors is used to determine the occupancy map 156 as the AMD 104 moves or explores a physical space 102. Generally, for objects that are not difficult-to-detect, active sensors may provide more precise depth data with regard to an object's location, size, and shape. For these objects, occupancy data may indicate presence of an object with confidence values that are above a confidence threshold. For example, a confidence threshold may be 80%. In another example, the confidence threshold may be greater than or less than 80%. Because the occupancy map 156 used by the AMD 104 includes occupancy data based on both active sensors and passive sensors, the occupancy map 156 includes indications of ordinary objects with high probability and difficult-to-detect objects with at least some indication of presence. As described below, the probability of the presence of a difficult-to-detect object may be increased by the AMD 104 using passive sensor data 164 from different poses to determine additional depth data based on features that may be detectable from the different poses. To determine passive sensor data 164 from different poses, the AMD 104 may change physical location, the one or more passive sensors may move or reorient, or both the AMD 104 may change physical location and the one or more passive sensors may move or reorient.

At a first time, time=1, the AMD 104 is at a first pose 404(1) with a first field-of-view 402(1). At the first time, the one or more cameras 344 may determine first image data 406(1) at a first pose of the one or more cameras 344. As described above, a pose may describe a location and orientation of the AMD 104 and also a location and orientation of one or more cameras 344. In this example, the pose of the AMD 104 is distinct from the pose of the one or more cameras 344. The first image data 406(1) may be used by the visual object class detection module 150 to determine a portion of the first image data 406(1) that includes a depiction of at least a portion of the object 106. The visual depth data module 152 may use the first image data 406(1) and second image data 406(2) to determine first passive sensor data 408(1) indicating a first one or more distances. The second image data 406(2) may be determined by the one or more cameras 344 at a second pose of the one or more cameras 344. At the first time, based on the first passive sensor data 408(1), the occupancy data 410(1) may determine a first object representation 412(1) with a first confidence value, A.

At a second time, time=2, the AMD 104 is at a second pose 404(2) with a second field-of-view 402(2). At the second time, the one or more cameras 344 may determine third image data 406(3) at a third pose of the one or more cameras 344. The third image data 406(3) may be used by the visual object class detection module 150 to determine a portion of the third image data 406(3) that includes a depiction of at least a portion of the object 106. The visual depth data module 152 may use the third image data 406(3) and fourth image data 406(4) to determine second passive sensor data 408(2) indicating a second one or more distances. The fourth image data 406(4) may be determined by the one or more cameras 344 at a fourth pose of the one or more cameras 344. At the second time, based on the second passive sensor data 408(2), the occupancy data 410(2) may determine a second object representation 412(2) with a second confidence value, (A+B), where A and B are non-negative.

In this example, the second confidence value, A, is increased by B, resulting in a confidence value in the object representation 412(2) that is increased based on determining passive sensor data 408 from multiple poses of the AMD 104. Confidence in the accuracy of the object representation 412 being representative of the physical area occupied by the object 106 may continue to be increased by repeating the determination of passive sensor data 408 based on additional poses of the AMD 104. The additional poses may also be determined by the AMD 104 as the AMD 104 is exploring the physical space 102. If the AMD 104 is exploring the physical space, the AMD 104 may determine additional poses based on moving to locations that are along a radius from the object 106. In some implementations, the occupancy data that is based on passive sensor data 164 may be used by the AMD 104 to focus on a physical area if the AMD 104 is traveling within a field-of-view of the physical area. For example, if the AMD 104 is moving through the physical space 102, and one or more fields-of-view from one or more passive or active sensors include the physical area, then the AMD 104 may pause, slow down, or reposition one or more cameras or sensors to determine additional sensor data 160 as the AMD 104 goes along a navigation path.

Figure 5:
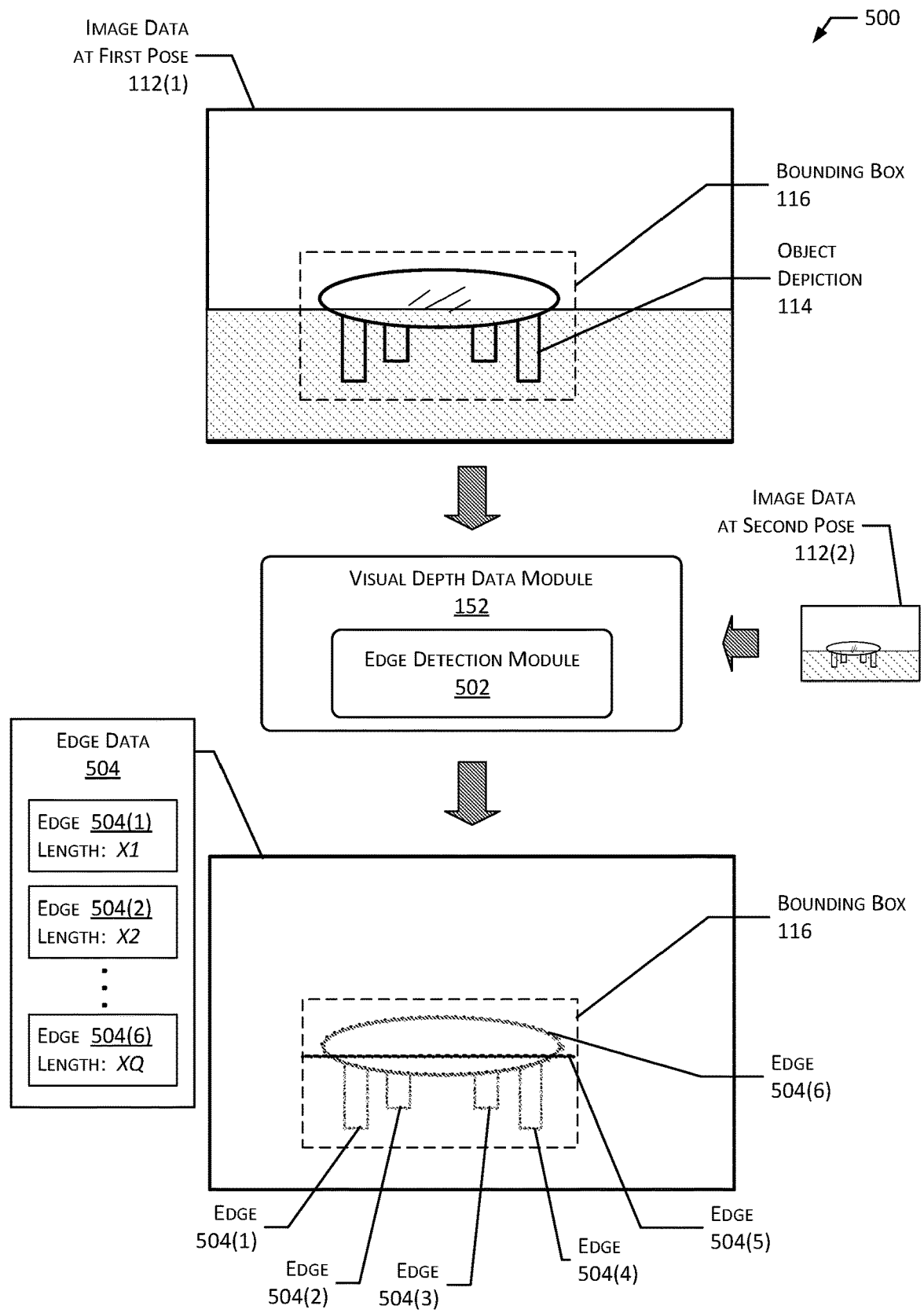
FIG. 5 illustrates edge detection to determine depth data, according to some implementations.

FIG. 5 illustrates, at 500, edge detection to determine depth data, according to some implementations.

In this example, the visual depth data module 152 determines one or more features within a region of pixels of the first image data 112(1) associated with a bounding box 116. The bounding box 116 may be determined by the visual object class detection module 150, as described with respect to FIG. 1. The one or more features may be one or more edges.

In this example, the visual depth data module 152 includes an edge detection module 502. The edge detection module 502 may determine one or more edges within the region of the first image data 112(1) indicated by the bounding box 116. The edge detection module 502 may determine a first one or more adjacent pixels having a brightness that is greater than a threshold difference to a second one or more adjacent pixels. The first one or more pixels may comprise an edge. In some examples, a Canny edge detector (John F. Canny, 1996) may be used to determine edges 504(1)-(6). In other examples, other edge detection algorithms may be used.

The visual depth data module 152 may determine a first one or more features of the first region in the bounding box 116, determined by the visual object class detection module 150. The first image data 112(1) may be determined image data 158 from a first camera 344 at a first pose. Second image data 112(2) may be determined from a second camera 344 at a second pose. The edge detection algorithm may use a first portion of the first image data 112(1) within the bounding box 116 and determine a first one or more edges.

In this example, to increase a confidence that an edge is part of an object 106, the first one or more features may be determined to be edges that include a greater number than or are longer than a threshold number of pixels. Edge data 504 may indicate each edge within the bounding box 116 that is greater than the threshold length. In this example, each of the edges 504(1)-(6), {X1, X2 . . . XQ}, indicated by the edge data 504 are determined to have an edge length greater than the threshold length.

The visual depth data module 152 may determine depth data indicative of one or more distances to portions of the object 106 in the physical space 102 associated with the object depiction 114. To determine the one or more distances, the visual depth data module 152 may use stereovision techniques on the first image data 112(1) determined at the first pose and the second image data 112(2) determined at the second pose. For example, the visual depth data module 152 may determine a second portion of pixels within the second image data 112(2) associated with pixel coordinates of the bounding box 116. The visual depth data module 152 may use the edge detection algorithm for the second portion of the second image data 112(2) and determine a second one or more edges.

Continuing with this example, a first set of pixels associated with the first set of features may be determined to be similar within a threshold variance with a second set of pixels associated with the second set of features. The threshold variance may be indicative of one or more of: a color value, a brightness value, or an intensity value. In this example, the difference in pixel coordinates between the first set of pixels and the second set of pixels may be used with respect to a relative difference between the first pose and the second pose and may be used to determine distance data associated with each of the first set of pixels or the second set of pixels.

Figure 6:
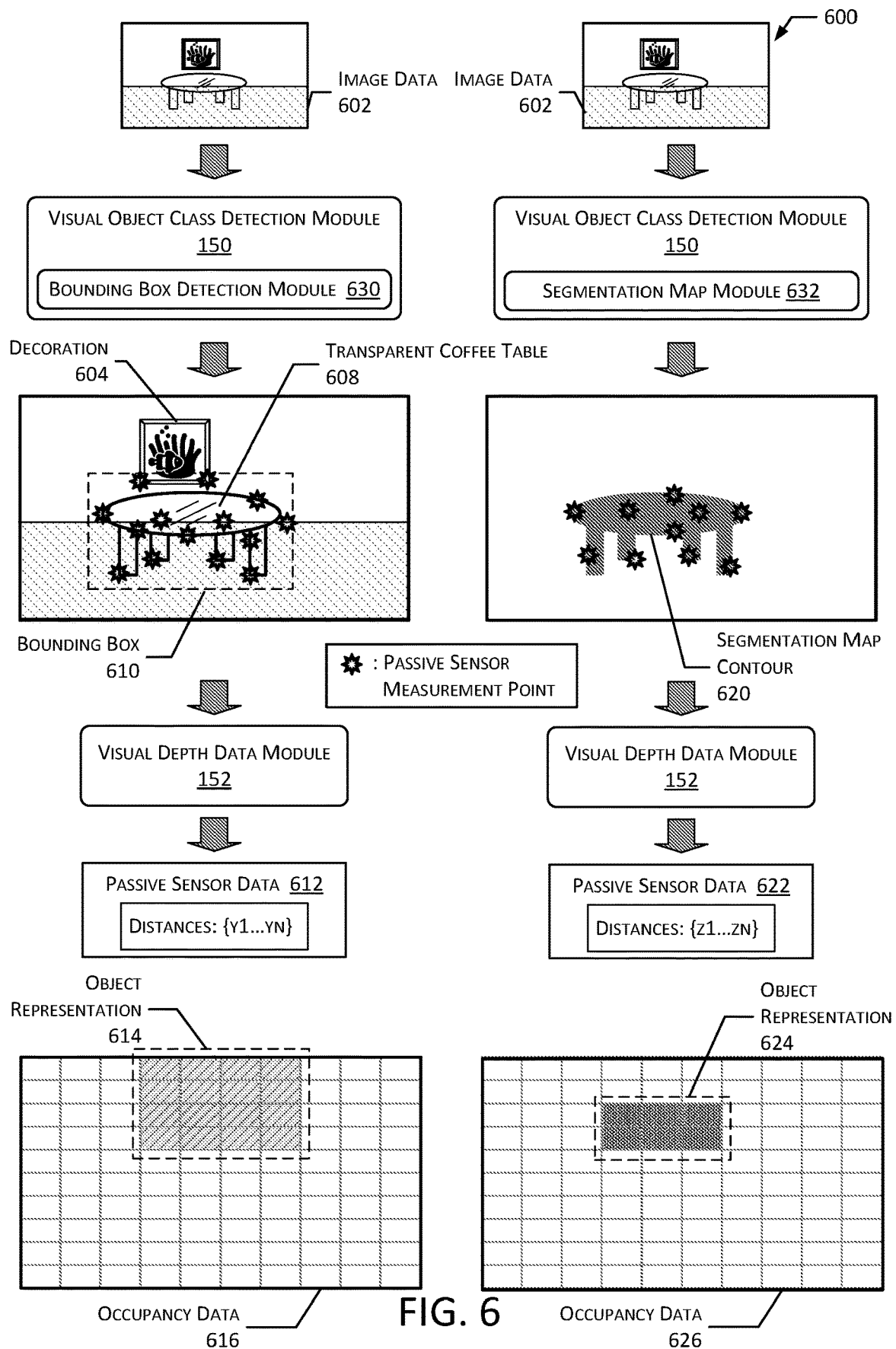
FIG. 6 illustrates object detection using passive sensor data, according to some implementations.

FIG. 6 illustrates, at 600, object detection using passive sensor data, according to some implementations.

In this implementation, first occupancy data 616 is determined based on using pixels within a bounding box 610, and second occupancy data 626 is determined using pixels within a segmentation map contour 620. The visual object class detection module 150 may include a bounding box detection module 630 and a segmentation map module 632. The bounding box detection module 630 may comprise a neural network trained to determine a bounding box around at least a portion of an identified difficult-to-detect object. The segmentation map module 632 may comprise a second neural network trained to classify each pixel of image data into one or more of multiple classes. The multiple classes may include a difficult-to-detect class of objects, furniture, pets, humans, among other classes of objects. The classified pixels may be associated with a contour that outlines at least a portion of a depiction of a difficult-to-detect object.

In a first example, first passive sensor data 612 is determined using a first one or more features within a bounding box 610 of image data 602. The first one or more features are used by the stereovision technique described above to determine a first one or more distances {Y1 ... YN} indicated by the first passive sensor data 612. The first one or more distances {Y1 ... YN} are used to determine a first one or more cells of the first occupancy data 616. The first one or more cells are associated with one or more physical areas of a physical space 102 that includes the difficult-to-detect object. The difficult-to-detect object is a transparent coffee table 608. The physical area also includes another object, decoration 604.

In this first example, the first passive sensor data 612 is used to determine first occupancy data 616. In this first example, the passive sensor measurement points include a first one or more features comprising: edges of the transparent coffee table 608, an edge along where the wall meets the floor of the physical space 102, and edges of the decoration 604 that are included in the bounding box 610. In this example, the first one or more features are determined based on the edges being longer than a threshold length. Using the stereovision technique, the first one or more distances include distances to each of the first one or more features, including: edges of the transparent coffee table 608, an edge along where the wall meets the floor of the physical space 102, and edges of the decoration 604. Because the first one or more distances include distances from a portion of the transparent coffee table 608 near the AMD 104 to the decoration 604 hanging on the wall, the object representation 614 includes cells associated with a physical area from the portion of the transparent coffee table 608 near the AMD 104 to the wall.

In a second example, the second passive sensor data 622 is used to determine second occupancy data 626. In this second example, the passive sensor data 622 is determined using a second one or more features associated with a segmentation map contour 620. In the second example, the second one or more features are also used by the stereovision technique to determine the second passive sensor data 622. However, in the second example, a trained neural network uses the image data 158 to determine a segmentation map. The neural network may be trained similarly to the neural network that determines boundary boxes around difficult-to-detect objects in the first example. The segmentation map may be partitioned into one or more segments. Each of the one or more segments may comprise an individual set of pixels. Each individual set of pixels may be associated with a category, a class, or a semantic label. For example, in this second example, the neural network determines the segmentation map, and determines that the segmentation map contour 620 is associated with the difficult-to-detect class of objects. The segmentation map contour 620 may outline and comprise a first plurality of pixels associated with at least a portion of a depiction of the object 106.

Continuing with this second example, the passive sensor measurement points are within the segmentation map contour 620. In contrast, the passive sensor measurement points in the bounding box 610 include edges associated with objects within the bounding box 610, such as the decoration 604 and the edge along where the wall meets the floor. Because the second one or more distances do not include distances between the transparent coffee table 608 and the wall, or between the AMD 104 and the wall, the object representation 624 includes cells that are more precisely associated with a physical area of the transparent coffee table 608.

Figure 7:
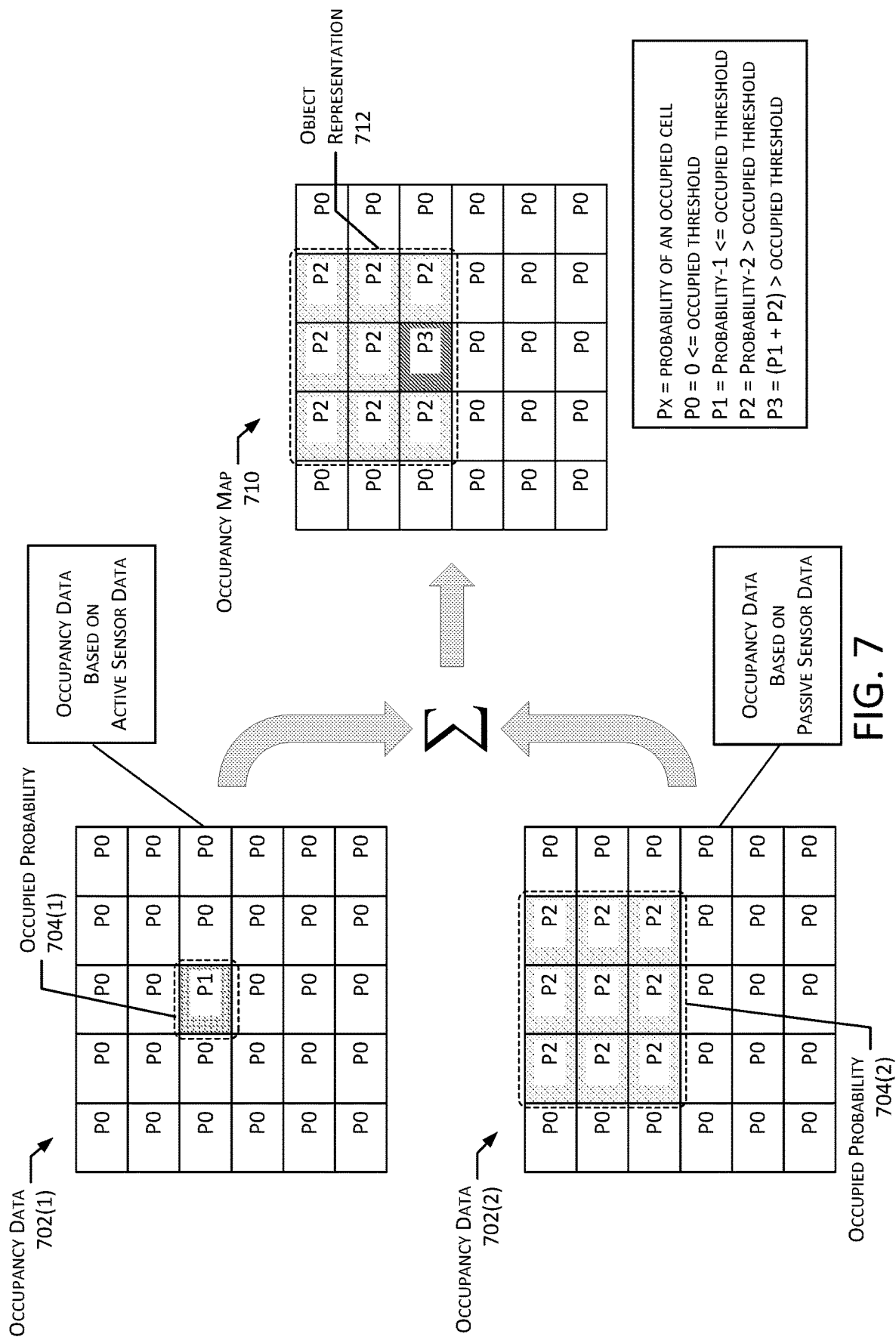
FIG. 7 illustrates determining an occupancy map based on occupancy data, according to some implementations.

FIG. 7 illustrates, at 700, determining an occupancy map based on occupancy data, according to some implementations.

In this example, an occupancy map 710 of a physical space 102 is determined based on first occupancy data 702(1) and second occupancy data 702(2). The first occupancy data 702(1) is based on active sensor data. The first occupancy data 702(1) is indicative of probabilities of a cell of an occupancy map 710 being occupied by an object 106 in a physical area associated with the cell. The second occupancy data 702(2) is based on passive sensor data. The second occupancy data 702(2) is indicative of probabilities of a cell of an occupancy map 710 being occupied by an object 106 in a physical area associated with the cell. In this example, the physical space 102 includes a difficult-to-detect object 106.

As depicted in this simplified example, the first occupancy data 702(1) is indicative of two probabilities, P0 and P1. The cells of the occupancy data 702(1) associated with probability P1 are indicated by occupied probabilities 704(1). In this example, P0 is zero and P1 is a non-zero value that is less than or equal to an occupied threshold. An occupied threshold is a threshold probability, such as the first probability threshold, the second probability threshold, or third probability threshold as described with respect to FIG. 1. In this example, based on P1 being less than or equal to the occupied threshold, if the occupancy map 710 is based on only the first occupancy data 710(1), then the occupancy map 710 would not be indicative of the difficult-to-detect object 106.

The second occupancy data 702(1) is indicative of two probabilities, P0 and P2. The cells of the occupancy data 702(2) associated with probability P2 are indicated by occupied probabilities 704(2). In this example, P0 is zero and P2 is a non-zero value that is greater than the occupied threshold. An occupied threshold is a threshold probability, such as the first probability threshold, the second probability threshold, or third probability threshold as described with respect to FIG. 1. In this example, based on P2 being greater than the occupied threshold, if the occupancy map 710 is based on only the second occupancy data 710(2), then the occupancy map 710 would be indicative of the difficult-to-detect object 106.

Individual occupancy data 702 may be associated with individual techniques of determining probabilities of occupied cells of an occupancy map 710. For example, first occupancy data 702(1) may be based on active sensor data, and second occupancy data 702(2) may be based on passive sensor data. As the AMD 104 explores or determines additional active sensor data, one or more probabilities associated with cells of the occupancy data 702 may be updated to indicate a change in probability due to additional active sensor data. Similarly, as the AMD 104 explores or determines additional passive sensor data, one or more probabilities associated with cells of the occupancy data 702 may be updated to indicate a change in probability due to the additional passive sensor data.

In one implementation, to make occupancy data for a difficult-to-detect object 106 resilient to removal due to lack of detection based on active sensor data, probabilities determined for the first occupancy data 702(1) based on active sensor data are not used to determine probabilities for the second occupancy data 702(2). In this example, if the occupancy data is based on a sum of probabilities from the first occupancy data 702(1) and the second occupancy data 702(2), then the occupancy map 710 may indicate the presence of an object 106 based on the first occupancy data 702(1). In contrast, in a different example, a cell of an occupancy map 710 may be determined to not be indicative of an object 106 occupying a physical area associated with the cell based on active sensors indicating the lack of presence of any objects 106 in the physical area. Continuing this example, by updating probabilities associated with different occupancy data separately, probabilities associated with given occupancy data may persist when different sources of sensor data are not in agreement with regard to whether an object 106 is present. In this way, objects 106 that are difficult to detect may continue to be included in an occupancy map 710 when different sensors provide different indications of whether an object 106 is present in the physical space.

In one implementation, instead of active sensor data and passive sensor data being used to determine independent occupancy data, threshold values may be used to determine whether sensor data 160 from the active sensors are used to modify the occupancy data based on passive sensor data. For example, an AMD 104 may explore a physical space 102 and use active sensor data to determine first occupancy data 702(1) and passive sensor data to determine second occupancy data 702(2). In this example, the passive sensor data may be indicative of a difficult-to-detect object 106. In this example, one or more cells indicating occupancy of the difficult-to-detect object 106 may continue to indicate occupancy unless a confidence level of active sensor data associated with the one or more cells is greater than a confidence threshold. In some examples, the confidence threshold may be determined such that the confidence threshold is exceeded based on multiple measurements of the active sensors from multiple poses of the AMD 104. For example, the confidence threshold may be 50%. In other examples, the confidence threshold may be greater than or less than 50%.

Figure 8:
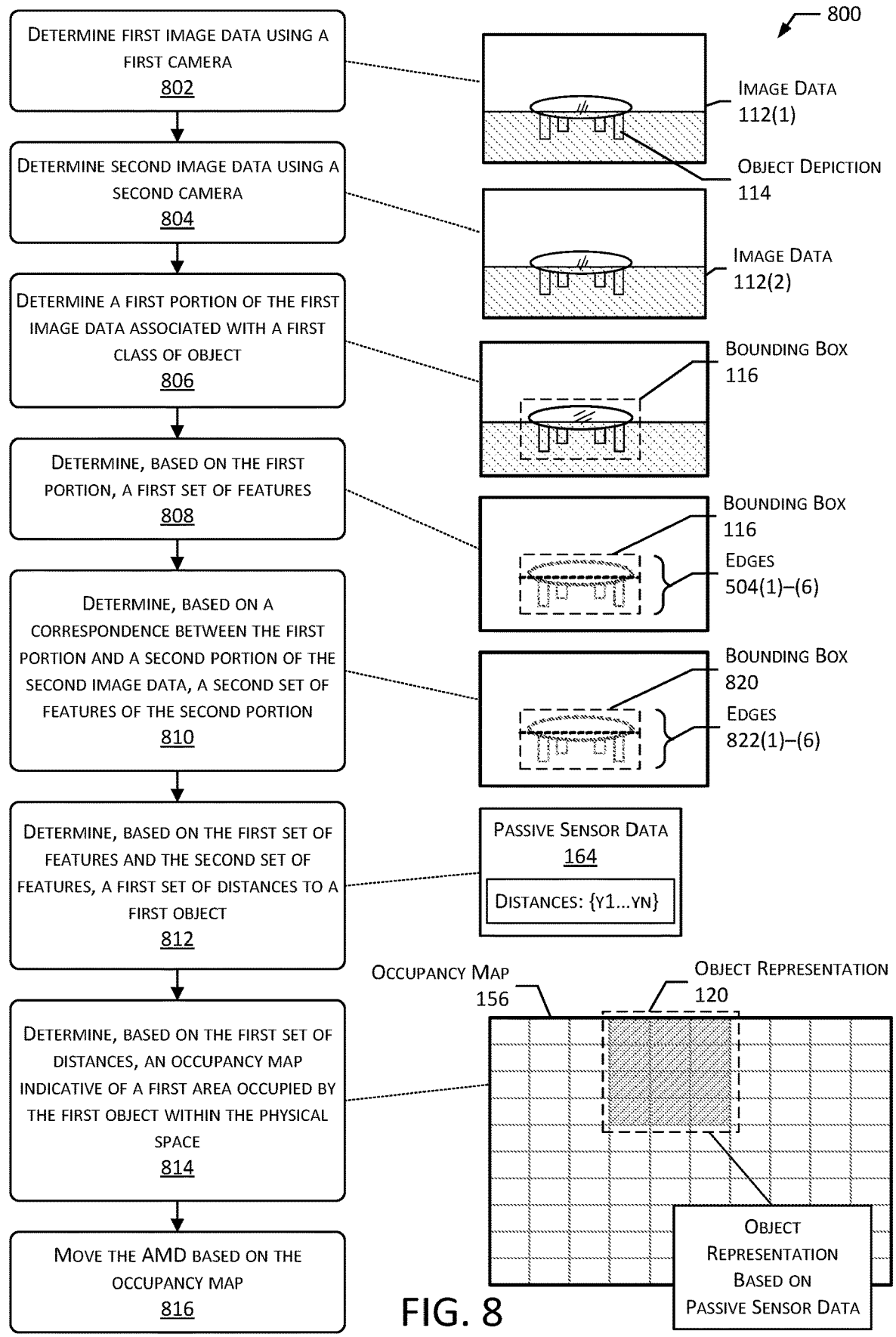
FIG. 8 illustrates a flow diagram for object detection, according to some implementations.

FIG. 8 illustrates, at 800, a flow diagram for object detection, according to some implementations.

In this example, with reference to the physical space 102 depicted in FIG. 1, the AMD 104 may explore the physical space 102 and use passive sensor data to determine presence of a difficult-to-detect object, such as object 106. In this example, the AMD 104 may comprise a stereocamera. The stereocamera may comprise a first camera and a second camera. In the following flow diagram, as an AMD 104 changes poses, the first camera and the second camera also change poses. For example, if the AMD 104 changes poses by moving in a first direction by a number of meters, then the first camera and the second camera also change poses based on the number of meters moved by the AMD 104. Similarly, if the AMD 104 changes poses by rotating by a first number of degrees, then the poses of the first camera and the second camera change based on the first number of degrees of rotation.

In some implementations, the first camera and the second camera may change poses independently of the AMD 104. For example, the first camera and the second camera may be mounted on a telescoping mast of the AMD 104. The telescoping mast may move up or down independently of movement of a chassis of the AMD 104. For example, the AMD 104 may not move any wheels while the telescoping mast moves up or down. In another example, the first camera and the second camera may be independently moveable and may change poses without the chassis of the AMD 104 changing poses. For example, the first camera and the second camera may rotate in various directions to change the pose of the first camera, the second camera, or both the first camera and the second camera.

At 802, the AMD 104 determines first image data 112(1) using a first camera. For example, the AMD 104 may determine that it is in a first pose or orient to be in the first pose. The AMD 104 may comprise a stereocamera, and the first image data 112(1) is representative of a scene in the physical space 102 determined by the AMD 104 in the first pose. A given pose may be indicative of a particular location with respect to a plurality of orthogonal axes and rotation with respect to individual ones of the axes. For example, the given pose may comprise six-dimensional (6D) information indicative of coordinates in three-dimensional space with respect to a designated origin, and rotation with respect to each of the three axes. The first pose may be used to describe location and orientation for the AMD 104, a second pose may be used to describe a location and orientation of the first camera, and a third pose may be used to describe a location and orientation of the second camera.

At 804, the AMD 104 determines second image data 112(2) using the second camera. For example, the image data 112(1) is representative of the scene in the physical space 102 determined by the second camera at a third pose, as described above.

At 806, the AMD 104 determines a first portion of the first image data 112(1) associated with a first class of object. For example, the visual object class detection module 150 may use the first image data 112(1) to determine a bounding box 116. The visual object class detection module 150 may comprise a trained neural network. The neural network is trained to identify difficult-to-detect objects based on the appearance of a difficult-to-detect object in image data. In this example, the neural network identifies the depiction of the object 106 as a difficult-to-detect object and determines a bounding box 116 as the first portion of the first image.

At 808, the AMD 104 determines, based on the first portion, a first set of features. For example, the visual depth data module 152 may determine a first one or more features of the first portion. The visual depth data module 152 may use an edge detection algorithm for the first portion of the first image data 112(1) within the bounding box 116 and determine a first one or more edges. To increase a confidence that an edge is part of an object, the first one or more features may be determined to be edges that include or are longer than a threshold number of pixels. In this example, the first set of features comprises the first one or more edges 504(1)-(6). Determination of edges 504(1)-(6) is described with respect to FIG. 5.

At 810, the AMD 104 determines, based on a correspondence between the first portion and a second portion of the second image data 112(2), a second set of features of the second portion. For example, the visual depth data module 152 may determine a second portion of pixels within the second image data 112(2) associated with pixel coordinates of the bounding box 116. The second portion of pixels may be within a portion of the image associated with bounding box 820. In this example, bounding box 820 has the same pixel coordinates as bounding box 116. The visual depth data module 152 may use the edge detection algorithm for the second portion of the second image data 112(2) and determine a second one or more edges, edges 822(1)-(6).

At 812, the AMD 104 determines, based on the first set of features and the second set of features, a first set of distances to a first object. For example, a first set of pixels associated with the first set of features may be determined to be similar within a threshold variance with a second set of pixels associated with the second set of features. The threshold variance may be indicative of one or more of: a color value, a brightness value, or an intensity value. In this example, the difference in pixel coordinates between the first set of pixels and the second set of pixels may be used with respect to a relative difference between the second pose and the third pose and may be used to determine distance data associated with each of the first set of pixels or the second set of pixels. In this example, passive sensor data 164 comprises the distance data, indicated as distances {Y1 . . . YN}.

At 814, the AMD 104 determines, based on the first set of distances, an occupancy map 156 indicative of a first area occupied by the first object within the physical space 102. For example, a cell in an occupancy map 156 may be indicative of a physical area associated with the cell being occupied by an object 106 in the physical space 102. In this example, the first set of distances may be used to determine a point cloud associated with the first object, object 106. In this example, each cell of the occupancy map 156 that is associated with a physical area associated with the point cloud may be updated to indicate occupancy of the first object. In this example, the object representation 120 is indicative of the physical area occupied by the first object.

At 816, the AMD 104 moves based on the occupancy map 156. For example, the AMD 104 may determine a navigation path that avoids traveling through the physical area of the physical space 102 that is associated with the object representation 120 indicated by the occupancy map 156.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
   a first camera;
   a second camera;
   one or more active sensors;
   one or more memories storing computer-executable instructions; and
   one or more processors to execute the computer-executable instructions to:
   determine, using the one or more active sensors, active sensor data associated with a field-of-view that includes a first area of a physical space;
   determine that the AMD is in a first pose;
   determine, using the first camera, first image data representative of a second area within the physical space, wherein the second area includes at least a portion of the first area;
   determine, using the second camera, second image data representative of the second area within the physical space;
   determine a first portion of the first image data that depicts a first object that is within the at least a portion of the first area, wherein the first object is associated with a first class of objects, and wherein the first class of objects is associated with active sensor data that has confidence values less than a confidence threshold;

determine a first set of features that are associated with the first portion of the first image data;

determine, based on a correspondence between the first portion and a second portion of the second image data, a second set of features that are associated with the second portion;

determine, based on the first set of features and the second set of features, a first set of distances from the AMD to the first object;

determine, based on the first set of distances, a first value indicative of a likelihood that the first object is present in the first area of the physical space; and move the AMD based at least in part on the first value.

2. The AMD of claim 1, wherein the one or more processors further execute the computer-executable instructions to:

determine, based on the active sensor data, a second set of distances relative to the AMD, wherein the second set of distances are associated with the first area of the physical space;

determine, based on the second set of distances, a second value that is indicative of a likelihood that the first object is present at the first area; and wherein the instructions to move the AMD are further based at least in part on the second value.

3. The AMD of claim 1, wherein the one or more processors execute the computer-executable instructions further to:

orient the AMD in a second pose;

determine, using the first camera, third image data representative of the second area within the physical space;

determine, using the second camera, fourth image data representative of the second area within the physical space;

determine, based on a correspondence between the second portion of the second image data and a third portion of the third image data, a third set of features that are associated with the third portion;

determine, based on a correspondence between the third portion of the third image data and a fourth portion of the fourth image data, a fourth set of features that are associated with the fourth image data;

determine, based on the third set of features and the fourth set of features, a second set of distances to the first object;

determine, based on the second set of distances, a second value that is indicative of a likelihood that the first object is present at the first area; and determine an occupancy map based on the first value, the first set of distances, the second value, and the second set of distances.

4. The AMD of claim 1, wherein the one or more processors execute the computer-executable instructions further to:

train a neural network to identify objects that are associated with active sensor data that has a confidence value less than the confidence threshold; and determine, based on the first image data and the neural network, that the first object is associated with the first class of objects.

5. The AMD of claim 1, wherein the one or more processors execute the computer-executable instructions further to:

determine, based on the first portion of the first image data, pixels associated with an edge of the first object; and determine that the edge is associated with a length value that is greater than a first threshold indicative of a presence of an object that includes the edge;

wherein the first set of features comprises the edge.

6. The AMD of claim 1, wherein the one or more processors execute the computer-executable instructions further to:

determine, based on the first portion of the first image data, pixels associated with a vertical edge of the first object;

wherein the first set of features comprises the vertical edge.

7. The AMD of claim 1, wherein to determine the first portion of the first image data, the one or more processors execute the computer-executable instructions further to:

determine a segmentation map of the first image data; and determine, based on the segmentation map, a contour that outlines at least a portion of the first object depicted in the first image data;

wherein the first portion comprises the at least a portion of the first object depicted in the first image data that is bounded by the contour.

8. The AMD of claim 1, wherein the one or more active sensors comprise:

one or more time-of-flight sensors; and wherein the one or more processors execute the computer-executable instructions further to:

determine, based on the active sensor data, a second set of distances associated with a field-of-view that includes the first area;

determine, based on the second set of distances, a second value associated with the first area, wherein the second value is indicative of a likelihood that the first object is present at the first area; and determine an occupancy map based on the first set of distances, the first value, the second set of distances, and the second value;

wherein movement of the AMD is based at least in part on the occupancy map.

9. The AMD of claim 8, wherein the one or more processors execute the computer-executable instructions further to:

determine a third value indicative of a sum of the first value and the second value;

determine first data indicative of one of:

a first speed based on the third value being greater than a first threshold;

a second speed based on the third value being greater than a second threshold and less than or equal to the first threshold, wherein the first speed is less than the second speed; or a third speed based on the third value being less than or equal to the second threshold, wherein the second speed is less than the third speed; and move the AMD based on the first data.

10. The AMD of claim 8, wherein the one or more processors execute the computer-executable instructions further to:

determine a third value indicative of a sum of the first value and the second value;

determine that the third value is greater than a first threshold indicative of the first object occupying the first area; and determine a navigation path that avoids the first area, wherein the AMD moves to avoid the first area.

11. A device comprising:
one or more cameras;
one or more active sensors;
one or more memories storing computer-executable instructions; and
one or more processors to execute the computer-executable instructions to:
   determine, using the one or more active sensors, active sensor data associated with a field-of-view that includes a first area of a physical space;
   determine, using the one or more cameras, first image data representative of a second area within the physical space, wherein the second area includes at least a portion of the first area;
   determine, based on the first image data, a first portion of the first image data that depicts a first object that is within the at least a portion of the first area, and wherein the first object is associated with a first class of objects, wherein the first class of objects is associated with active sensor data that has confidence values less than a confidence threshold;
   determine a first set of features that are associated with the first portion of the first image data;
   determine, based on the first set of features, a first set of distances from the device to a first object;
   determine, based on the first set of distances, a first value that is indicative of a first probability that the first area of the physical space is occupied by the first object; and
   send input to a movable component of the device to cause movement of the device based at least in part on the first value.

12. The device of claim 11,
wherein the one or more processors further execute the computer-executable instructions to:
   determine, based on the active sensor data, a second set of distances relative to the device, wherein the second set of distances are associated with the first area of the physical space;
   determine, based on the second set of distances, a second value that is indicative of a likelihood that the first area of the physical space is occupied by the first object; and
   move the device based on the first value, the first set of distances, the second value, and the second set of distances.

13. The device of claim 11, wherein the one or more processors execute the computer-executable instructions further to:
   determine, based on the first image data and using a neural network that is trained to identify objects associated with active sensor data that has a confidence value less than the confidence threshold, that the first object is associated with the first class of objects.

14. The device of claim 11, wherein the one or more processors execute the computer-executable instructions further to:
   determine, based on the first portion of the first image data, pixels associated with an edge of the first object; and
   determine that the edge is associated with a length value that is greater than a first threshold indicative of presence of an object that includes the edge;
   wherein the first set of features comprises the edge.

15. The device of claim 11, wherein to determine the first portion of the first image data, the one or more processors execute the computer-executable instructions further to:
   determine a segmentation map of the first image data; and
   determine, based on the segmentation map, a contour that outlines at least a portion of a depiction of the first object in the first image data;
   wherein the first portion comprises the at least a portion of the depiction of the first object in the first image data that is bounded by the contour.

16. The device of claim 11,
wherein the one or more processors execute the computer-executable instructions further to:
   determine, based on the active sensor data, a second set of distances associated with the field-of-view that includes the first area;
   determine, based on the second set of distances, a second value indicative of a second probability that the first object occupies the first area;
   determine a third value indicative of a sum of the first value and the second value;
   determine first data indicative of one of:
      a first speed based on the third value being greater than a first threshold;
      a second speed based on the third value being greater than a second threshold and less than or equal to the first threshold, wherein the first speed is less than the second speed; or
      a third speed based on the third value being less than or equal to the second threshold, wherein the second speed is less than the third speed; and
   move the device based on the first data.

17. The device of claim 11,
wherein the one or more processors execute the computer-executable instructions further to:
   determine, based on the active sensor data, a second set of distances associated with the field-of-view that includes the first area;
   determine, based on the second set of distances, a second value indicative of a second probability that the first object occupies the first area;
   determine a third value indicative of a sum of the first value and the second value;
   determine that the third value is greater than a first threshold indicative of the first object occupying the first area; and
   determine, based on the third value being greater than the first threshold, a navigation path that avoids the first area.

18. A method comprising:
determining, based on a signal emitted by one or more sensors, sensor data indicative of a first set of distances associated with a first physical area of a physical space;
determining, using a first camera, first image data representative of a second physical area of the physical space, wherein the second physical area includes at least a portion of the first physical area;
determining, using a second camera, second image data representative of the second physical area;
determining, based on one or more of the first image data or the second image data, a portion of the one or more of the first image data or the second image data that depicts a first object that is within the at least a portion of the first physical area, wherein the first object is associated with a first class of objects, and wherein the first class of objects is associated with sensor data that has confidence values less than a confidence threshold;

in response to determining that the first object is associated with the first class of objects, determining, based on the first image data and the second image data, a second set of distances associated with the second physical area of the physical space;

determining, based on the first set of distances, a first value indicative of a likelihood of the first object occupying the first physical area of the physical space;

determining, based on the second set of distances, a second value indicative of a likelihood of the first object occupying the first physical area of the physical space; and moving an autonomous mobile device based on the first value, the first set of distances, the second value, and the second set of distances.

19. The method of claim 18, further comprising:

determining, based on the first image data, a first portion of the first image data that is associated with the first object;

determining a first set of features that are associated with the first portion of the first image data;

determining, based on a correspondence between the first portion and a second portion of the second image data, a second set of features that are associated with the second portion; and determining, based on the first set of features and the second set of features, the first set of distances to the first object.

20. The method of claim 19, further comprising:

determining, based on the first image data, that the first object is associated with the first class of objects using a neural network that is trained to identify objects associated with sensor data that has a confidence value less than the confidence threshold.

* * * * *